US012142444B2

(12) United States Patent
Sullivan et al.

(10) Patent No.: US 12,142,444 B2
(45) Date of Patent: Nov. 12, 2024

(54) LEVITATION FUSE DEVICE

(71) Applicant: Gigavac, LLC, Carpinteria, CA (US)

(72) Inventors: Daniel Sullivan, Santa Barbara, CA (US); Bernard Bush, Santa Barbara, CA (US); Murray McTigue, Carpinteria, CA (US)

(73) Assignee: Gigavac, LLC, Carpinteria, CA (US)

(*) Notice: Subject to any disclaimer, the term of this patent is extended or adjusted under 35 U.S.C. 154(b) by 204 days.

(21) Appl. No.: 17/382,245

(22) Filed: Jul. 21, 2021

(65) Prior Publication Data

US 2022/0028639 A1 Jan. 27, 2022

Related U.S. Application Data

(60) Provisional application No. 63/055,172, filed on Jul. 22, 2020.

(51) Int. Cl.
*H01H 39/00* (2006.01)
*H01H 3/02* (2006.01)
(Continued)

(52) U.S. Cl.
CPC ............ *H01H 39/006* (2013.01); *H01H 3/02* (2013.01); *H01H 9/102* (2013.01);
(Continued)

(58) Field of Classification Search
CPC ........ H01H 37/76; H01H 85/00; H01H 39/00; H01H 1/14; H01H 1/50; H01H 39/006;
(Continued)

(56) References Cited

U.S. PATENT DOCUMENTS 3,528,045 A * 9/1970 Shoffa ................ H01H 36/0006 335/204
4,825,020 A * 4/1989 Rao ........................ H01H 15/18 200/16 D
(Continued)

FOREIGN PATENT DOCUMENTS

| | | | |
|---|---|---|---|
| DE | 102012212509 | B4 | 3/2014 |
| FR | 2829869 | B1 | 10/2003 |
| WO | 2019206467 | A1 | 10/2019 |

OTHER PUBLICATIONS

International Search Report and Written Opinion for App. No. PCT/US21/42649, dated Nov. 16, 2021, 10 pages.
(Continued)

*Primary Examiner* — Anthony R Jimenez
(74) *Attorney, Agent, or Firm* — Lee & Hayes, P.C.

(57) ABSTRACT

Fuse devices and electrical systems using the fuse devices are disclosed, with the fuse devices having internal components to cause a fuse blown event when the pre-determined current level is reached through the contacts. The internal components can comprise a levitation actuator that causes separation between one or more of the contacts as the current level approaches the predetermined level. This causes contact levitation and arcing, which increases the resistance at the contact being separated. This in turn causes the current through the contacts to seek another path that in the embodiments herein is a path to a pyro feature. The current activates the pyro feature, which causes the contacts to separate and puts the fuse device in "fuse blown" condition where currents can no longer flow through the contacts.

19 Claims, 19 Drawing Sheets

(51) Int. Cl.

| | |
|---|---|
| ***H01H 9/10*** | (2006.01) |
| ***H01H 71/32*** | (2006.01) |
| ***H01H 77/06*** | (2006.01) |
| ***H01H 85/165*** | (2006.01) |

(52) U.S. Cl.
CPC .......... *H01H 71/322* (2013.01); *H01H 77/06* (2013.01); *H01H 85/165* (2013.01)

(58) Field of Classification Search
CPC ........ H01H 3/02; H01H 9/102; H01H 71/322; H01H 77/06; H01H 85/165; B60L 31/04; B60L 31/0007
USPC .......................................... 337/401; 200/52 R
See application file for complete search history.

(56) References Cited

U.S. PATENT DOCUMENTS 6,373,014 B1 * 4/2002 Mitsuhashi ............ H01H 77/10 335/16
6,984,795 B1 1/2006 Kowalik
8,592,709 B2 * 11/2013 Newase ............. H01H 71/1045 218/156
11,527,367 B2 * 12/2022 Burkett ................ H01H 39/004
2012/0056699 A1 3/2012 Valdemarsson
2013/0092658 A1 4/2013 Ache
2015/0054606 A1 2/2015 Naka
2015/0084721 A1 3/2015 Ziegler
2017/0352507 A1 12/2017 Kim
2017/0353507 A1 12/2017 Patel
2021/0166901 A1 * 6/2021 Cacciatore ............... H01H 1/14

OTHER PUBLICATIONS

Extended European Search Report mailed Dec. 22, 2023 for European Application No. 21847361.9, a foreign counterpart to U.S. Appl. No. 17/382,245, 12 pages.

* cited by examiner

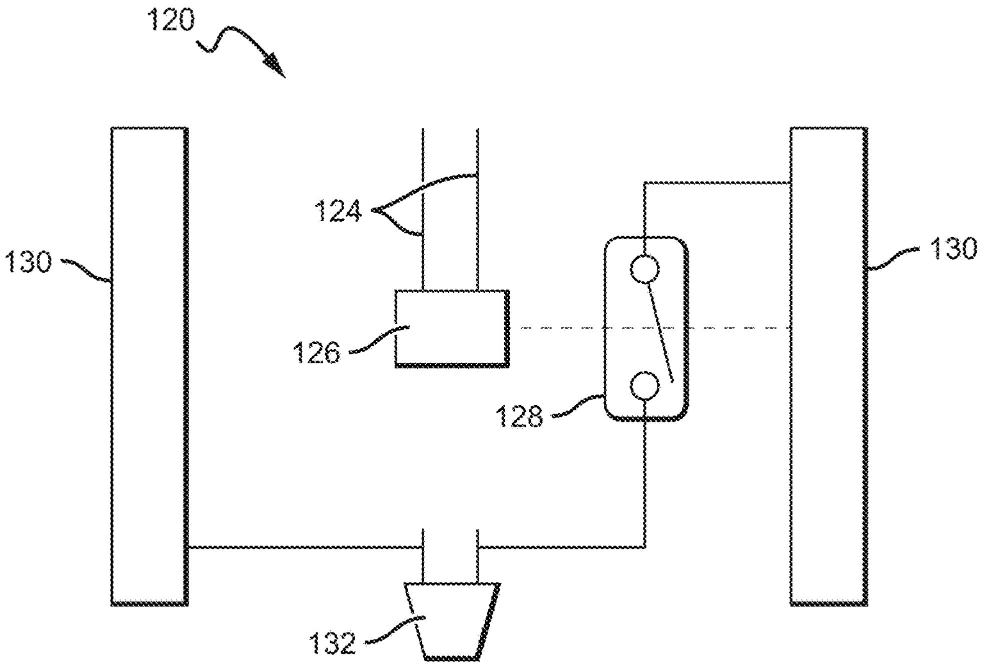
FIG. 7
FIG. 8
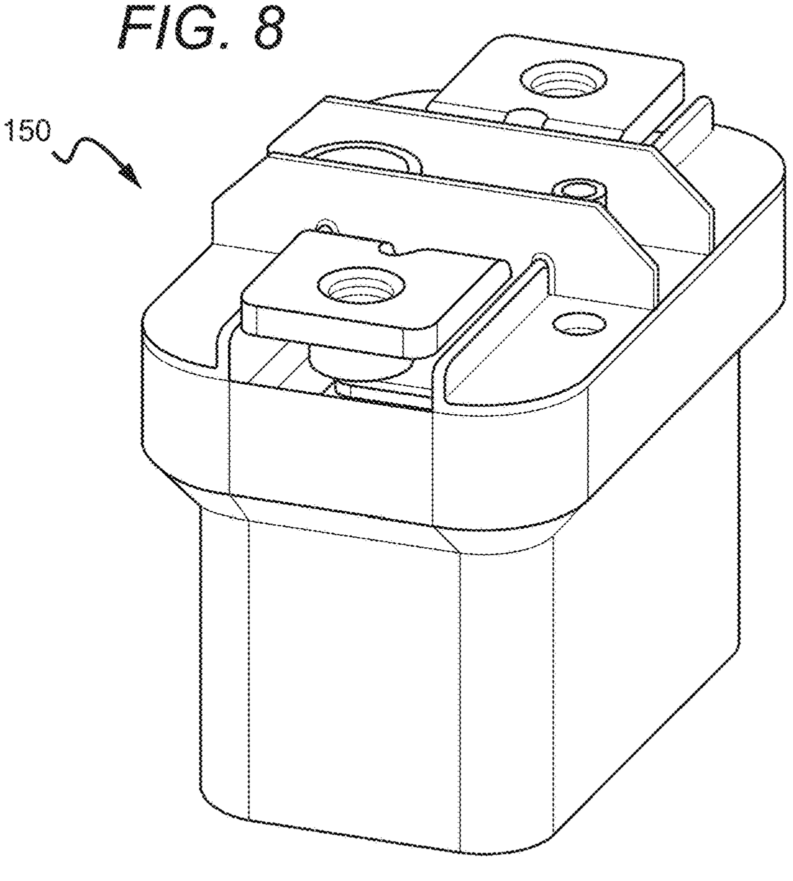

FIG. 11
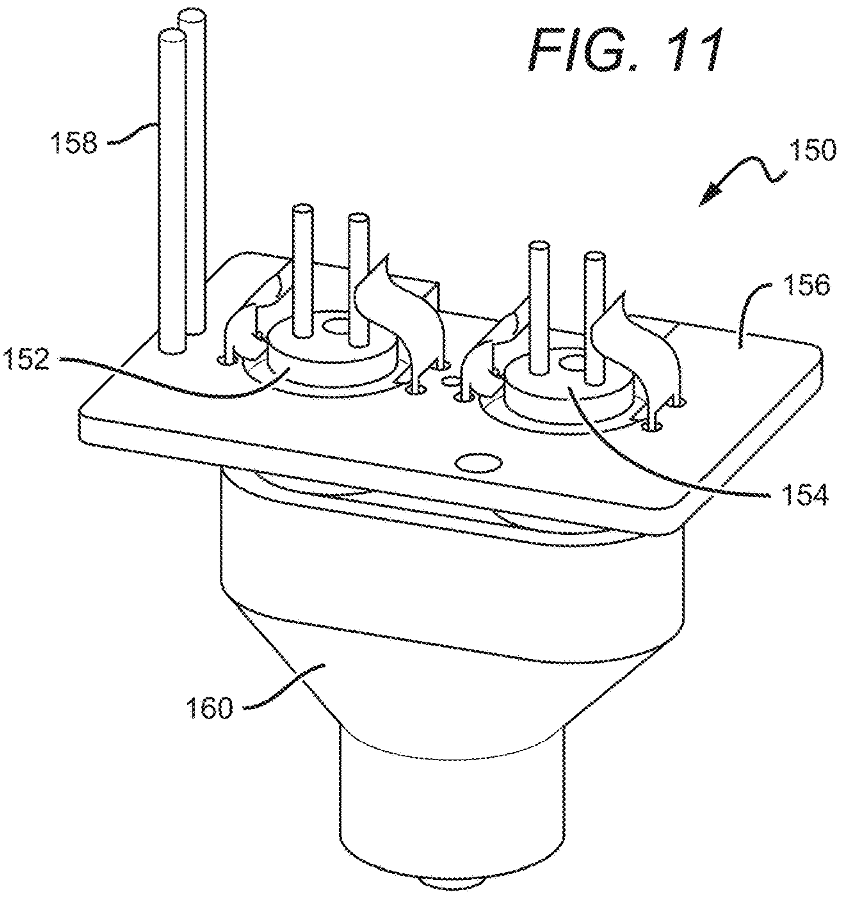
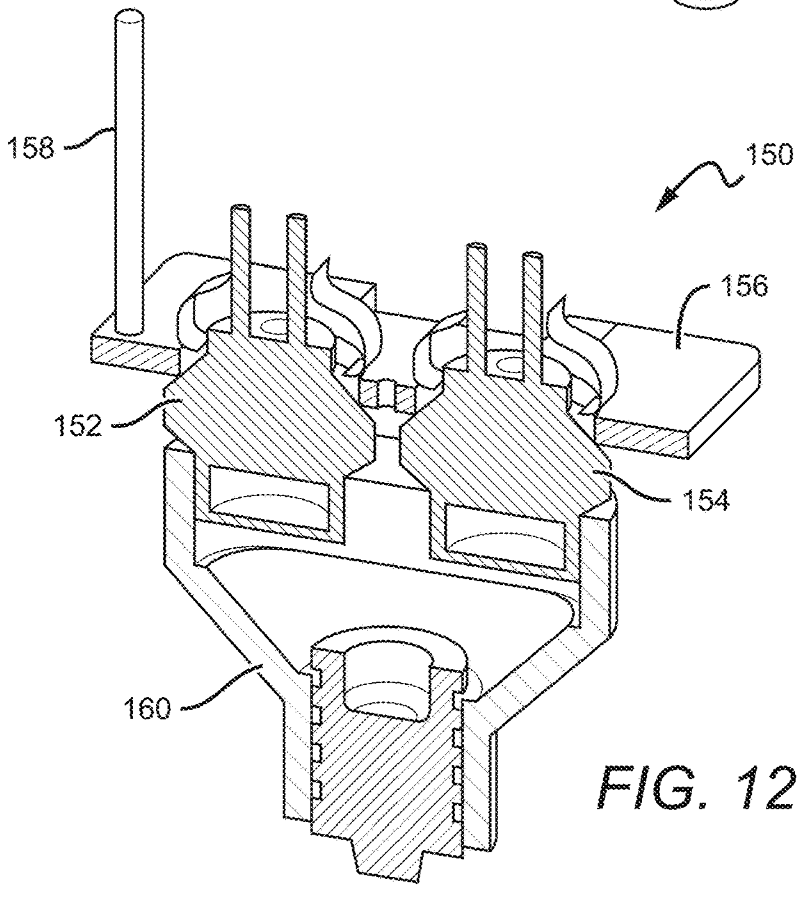
FIG. 12

LEVITATION FUSE DEVICE

This application claims the benefit of U. S. Provisional Patent Application No. 63/055,172, filed on Jul. 22, 2020.

BACKGROUND

Field of the Invention

Described herein are devices relating to triggering mechanisms and configurations for use with electrical switching devices such as electrical fuse devices.

Description of the Related Art

Connecting and disconnecting electrical circuits is as old as electrical circuits themselves and is often utilized as a method of switching power to a connected electrical device between "on" and "off" states. An example of one device commonly utilized to connect and disconnect circuits is a contactor, which is electrically connected to one or more devices or power sources. A contactor is configured such that it can interrupt or complete a circuit to control electrical power to and from a device. One type of conventional contactor is a hermetically sealed contactor.

In addition to contactors, which serve the purpose of connecting and disconnecting electrical circuits during normal operation of a device, various additional devices can be employed in order to provide overcurrent protection. These devices can prevent short circuits, overloading, and permanent damage to an electrical system or a connected electrical device. These devices include disconnect devices which can quickly break the circuit in a permanent way such that the circuit will remain broken until the disconnect device is repaired, replaced, or reset. One such type of disconnect device is a fuse device. A conventional fuse is a type of low resistance conductor that acts as a sacrificial device. Typical fuses comprise a metal wire or strip that melts when too much current flows through it, interrupting the circuit that it connects.

As society advances, various innovations to electrical systems and electronic devices are becoming increasingly common. An example of such innovations includes recent advances in electrical automobiles, which may one day become the energy-efficient standard and replace traditional petroleum-powered vehicles. In such expensive and routinely used electrical devices, overcurrent protection is particularly applicable to prevent device malfunction and prevent permanent damage to the devices. Furthermore, overcurrent protection can prevent safety hazards, such as electrical fires. These modern improvements to electrical systems and devices require modern solutions to increase convenience and efficiency of mechanisms for triggering fuse devices.

SUMMARY

The present invention is directed to fuse devices and electrical systems using the fuse devices, with the devices having internal components to cause a fuse blown event when the pre-determined current level is reached through the contacts. The internal components can comprise a levitation actuator that causes separation between one or more of the contacts as the current level approaches the predetermined level. This causes contact levitation and arcing, which increases the resistance at the contact being separated. This in turn causes the current through the contacts to seek another path that in the embodiments herein is a path to a pyro feature. The current activates the pyro feature, which causes the contacts to separate and puts the fuse device in "fuse blown" condition where currents can no longer flow through the contacts.

One embodiment of an electrical switching device according to the present inventions comprises at least two fixed contacts. A movable contact is arranged to operate in a first position where it is in electrical contact with the fixed contact. It is further arranged to operate in a second position where it is not in electrical contact with the fixed contacts. A levitation actuator is included on the movable contact or one of the fixed contacts. The levitation actuator causes separation between the movable contact and at least one of the fixed contacts when the movable contact is in the first position and a threshold current passes through the fixed contacts and the movable contact.

Another embodiment of an electrical switching device according to the present invention comprises a housing and fixed contacts arranged to be electrically coupled to components outside the housing and to conduct an electrical signal from the outside components to components internal to the housing. A moveable contact is included that is movable from a first position to allow current flow between the fixed contacts though the movable contact, to a second position where current does not flow from the fixed contacts through the movable contact. A levitation actuator is included to cause movement of the movable contact from the first position to the second position.

One embodiment of an electrical system, according to the present invention comprises in electrical circuit and an electrical device electrically connected to the electrical circuit to open or close the circuit. The switching device comprises at least two fixed contacts. A movable contact is movable from a first position where it is in electrical contact with the fixed contacts, to a second position where it is not in electrical contact with the fixed contacts. A levitation actuator is included on the movable contact or one of the fixed contacts. The levitation actuator causes separation between the movable contact and at least one of the fixed contacts when movable contact is in the first position and a threshold current passes through the fixed contacts and the movable contact.

These and other further features and advantages of the invention would be apparent to those skilled in the art from the following detailed description, taken together with the accompanying drawings, wherein like numerals designate corresponding parts in the figures, in which:

BRIEF DESCRIPTION OF THE DRAWINGS

FIG. 7 is a perspective view of another embodiment of a fuse device according to the present invention;

FIG. 8 is a perspective sectional view of another embodiment of a fuse device according to the present invention;

FIG. 11 is a partial perspective section view of another embodiment of a fuse device according to the present invention;

FIG. 12 is a schematic of one embodiment of a squib activation circuit according to the present invention;

DETAILED DESCRIPTION

Figure 1:
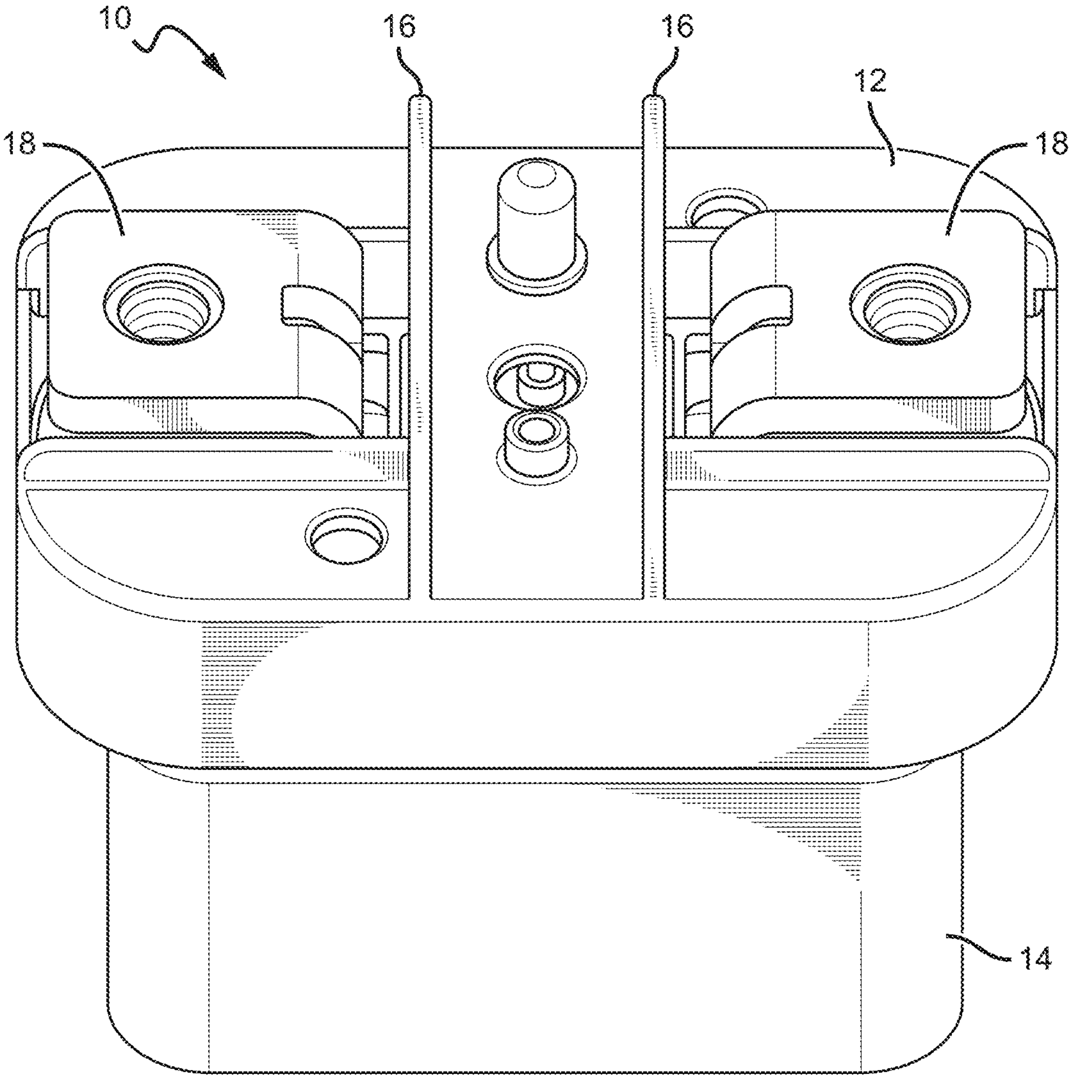
FIG. 1 is a perspective view of one embodiment of a fuse device according to the present invention.
Figure 2:
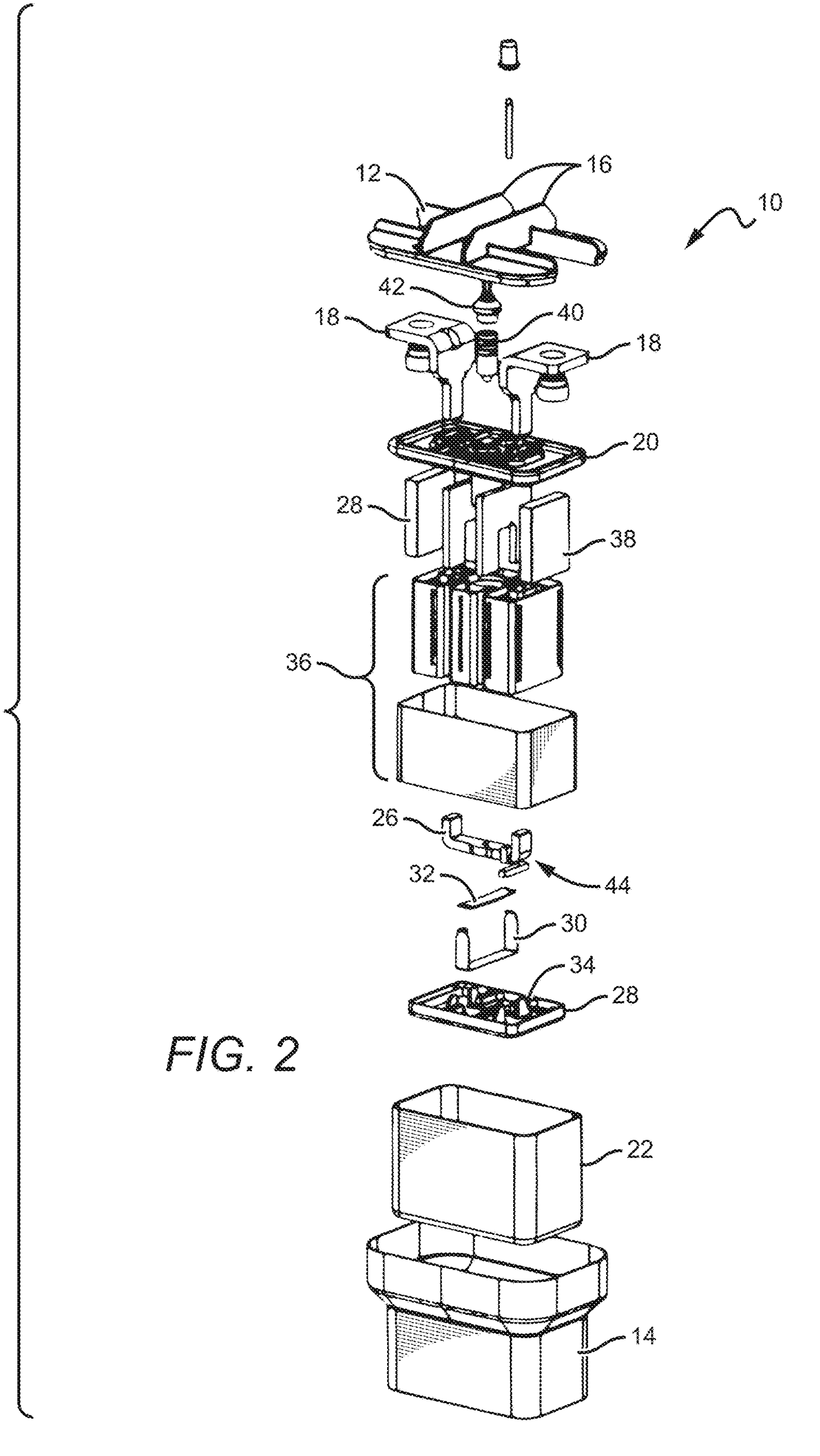
FIG. 2 is an exploded view of one embodiment of a fuse device according to the present invention.

The present disclosure will now set forth detailed descriptions of various embodiments. These embodiments set forth devices with switching features and disconnect configurations for use with switching devices, such as fuse devices integrating pyrotechnic circuit breaking features. These switching devices can be electrically connected to an electrical device or system to turn power to the connected device or system "on" or "off." The example devices disclosed herein can utilize different passive and/or active triggering configurations in addition to, or in lieu of, the disclosed switching features. The passive triggering features provide the advantage of automatically triggering a pyrotechnic circuit break in response to a threshold current level.

In some embodiments, the switching devices according to the present invention comprise an internal pyrotechnic charge coupled to a pyrotechnic activation or triggering mechanism. The pyrotechnic triggering mechanism can be coupled directly to the switching device's high voltage (fixed) contacts using known electrical coupling mechanisms. The pyrotechnic charge is configured to activate or blow the fuse device, permanently breaking the circuit, for example, by moving moveable contact out of contact with fixed contacts. This is referred to herein as a "fuse blown event". This is typically done in when the current passing through the fuse device exceeds a threshold level.

The fuse devices according to the present invention can comprise features to cause small or slight separation between the movable and fixed contacts at the elevated current levels exceeding the threshold level. In some embodiments, these features comprise levitation actuators which utilize the elevated current through the contacts to cause the separation. This separation can result in increased resistance through the contacts, such as causes arcing at the contacts. This causes the electrical signal flowing through the contacts to seek a path of lower resistance. Embodiments of the present invention can have pyrotechnic device coupled to the contacts through a path of lower resistance. Instead of passing through the contacts, the electrical signal on the contacts passes through the pyrotechnic device, causing activation which produces a force to separate the contacts. This causes a fuse blown event that breaks the conductive path through contacts.

The levitation actuators according to the present invention can have many different features arranged in many different ways. In some embodiments the levitation actuator can comprise one or more ferromagnetic components arranged on or around the moveable and/or fixed contact such that current in the contacts flows into the ferromagnetic components. In some of these embodiments, one for more of the components can be fixed and one or more can be mounted to the movable contact. When the current through the contacts reaches the threshold level, the current from the contacts passing through the ferromagnetic features generates magnetic fields that cause attraction between the two. This attraction can overcome the closing force holding the moving contact to the fixed contacts and can cause separation of at the movable contact from at least one of the fixed contacts. This causes the increased resistance as described above and activation of the pyrotechnic device.

This ferromagnetic attraction allows for the fuse devices according to the present invention to be designed to automatically trip or blow at a desired threshold current level. This current level can vary and be tailored based on a number of factors such as the size of the ferromagnetic features and the holding force of the movable contact to the fixed contacts.

Fuses and their internal contacts can also experience rotational forces on their internal contacts that can impact operation. Although the inventors do not want to be limited to any one theory of operation, it is understood that these rotational forces can at least partially be caused by the Lorentz forces that can effect the current traveling through fuse's permanent magnetic field. There rotational forces can cause slight rotation of the contacts within the fuse, such that portion of the contact can bind or rub on supporting structures. In some fuses made of certain materials (AgSnO on Ag) the contacts can also experience friction sticking. Both these above can result in the fuse having an unpredictable levitation current. The embodiments of the present invention as described in more detail below, can also comprise features to minimize or prevent this contact rotation, thereby providing a device with more predictable levitation characteristics.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent to the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

FIGS. 1-5 shows one embodiment of fuse device 10 according to the present invention, with the internal components best shown in FIGS. 2-5. The envelope that contains the internal components of the fuse device generally comprises a cover 12 and a housing 14. The housing 14 contains most of the components and can provide mounting features that can be specified to the particular customer installation. The cover 12 can provide a barrier to protect the fuse device features below the cover 12 and to provide mechanical strength to help the fuse device 10 withstand a pyro fuse interruption event (i.e. a fuse blown event). The fuse device comprises fixed contacts 18 are configured such that the various internal components of the fuse device 10 can be electrically connect to an external electrical system or device through the fixed contacts. This allows the fuse device 10 to complete an electrical circuit or to break an electrical circuit as described herein.

When not interacting with any of the other components internal to the housing 14, the fixed contacts are otherwise electrically isolated from one another such that electricity cannot freely flow between them. The fixed contacts 18 can comprise any suitable conductive material for providing electrical connection to the internal components of the fuse device, for example, various metals and metallic materials or any electrical contact material or structure that is known in the art. Each of the fixed contacts 18 can comprise single continuous contact structures (as shown) or can comprise multiple electrically connected structures. For example, in some embodiments, the fixed contacts 18 can comprise two portions. A first portion extends from the cover 12, which is electrically connected to a second portion internal to the fuse device 10 that is configured to interact with other components internal to the housing as described herein.

In the embodiment shown, the fixed contacts are accessible through the cover 12. The cover 12 can also comprise vertical walls 16 to provide external barriers between the contacts 18 to help maintain isolation between the contacts 18 during operation and during a fuse blown interruption event.

The fuse device 10 also comprises a cap assembly 20 that can be mounted to a cup 22 to form a fuse device body that can comprise any shape suitable for holding the fuse device's various internal components, with certain shapes including any regular or irregular polygon. In some embodiments, there can be a hermetic seal between the cap assembly 20 and cup 22. The hermetic seal can be maintained by including adhesives, such as epoxies, between the two, or by welding the two together. The fixed contacts 18 protrude through the cap assembly and pass from the fuse device's internal chamber formed by the cup 22 and cap assembly 20 so that they can be accessed for use. The cap assembly 20 forms an airtight or hermetic seal around the contacts 18. The cap assembly 20 can be made of many different materials, such as a plastic, and the cup 22 can be made of materials such as a plastic or metal.

In some embodiments, the cap assembly 20 and cup 22 can be at least partially filled with an electronegative gas, for example, sulfur hexafluoride or mixture of nitrogen and sulfur hexafluoride. In some embodiments, the cap assembly and cup comprises a material having low or substantially no permeability to a gas injected into the housing. In still other embodiments, the cap assembly and cup can comprise various gasses, liquids or solids, configured to increase performance of the device. In different embodiments, the fuse device body can be a continuous structure, or can comprise more that two component parts joined. Some example body configurations include those set forth in U.S. Pat. Nos. 7,321,281, 7,944,333, 8,446,240 and 9,013,254, all of which are assigned to Gigavac, Inc., the assignee of the present application, and all of which are hereby incorporated in their entirety by reference.

Figure 3:
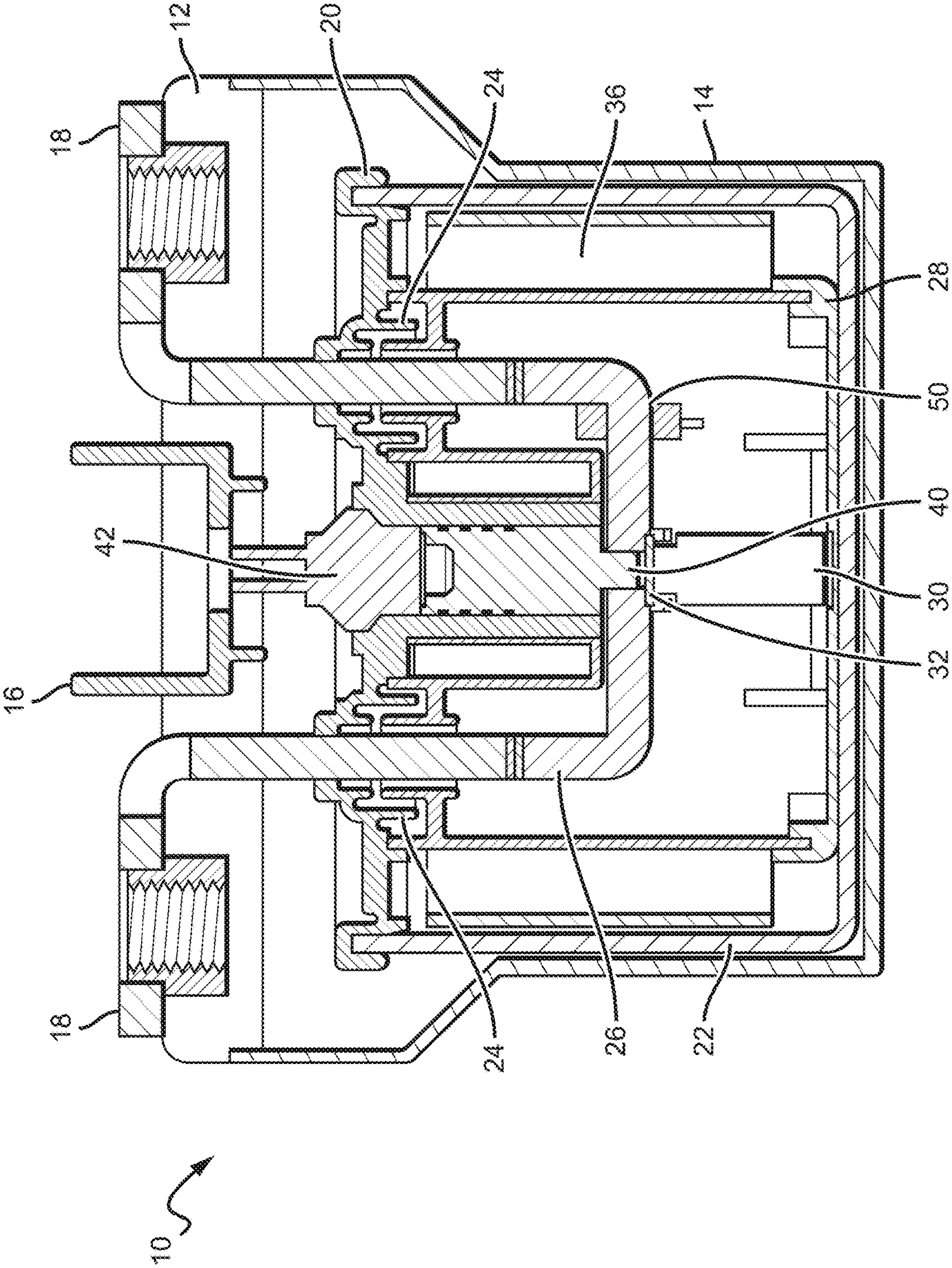
FIG. 3 is a sectional view of one embodiment of a fuse device according to the present invention.
Figure 4:
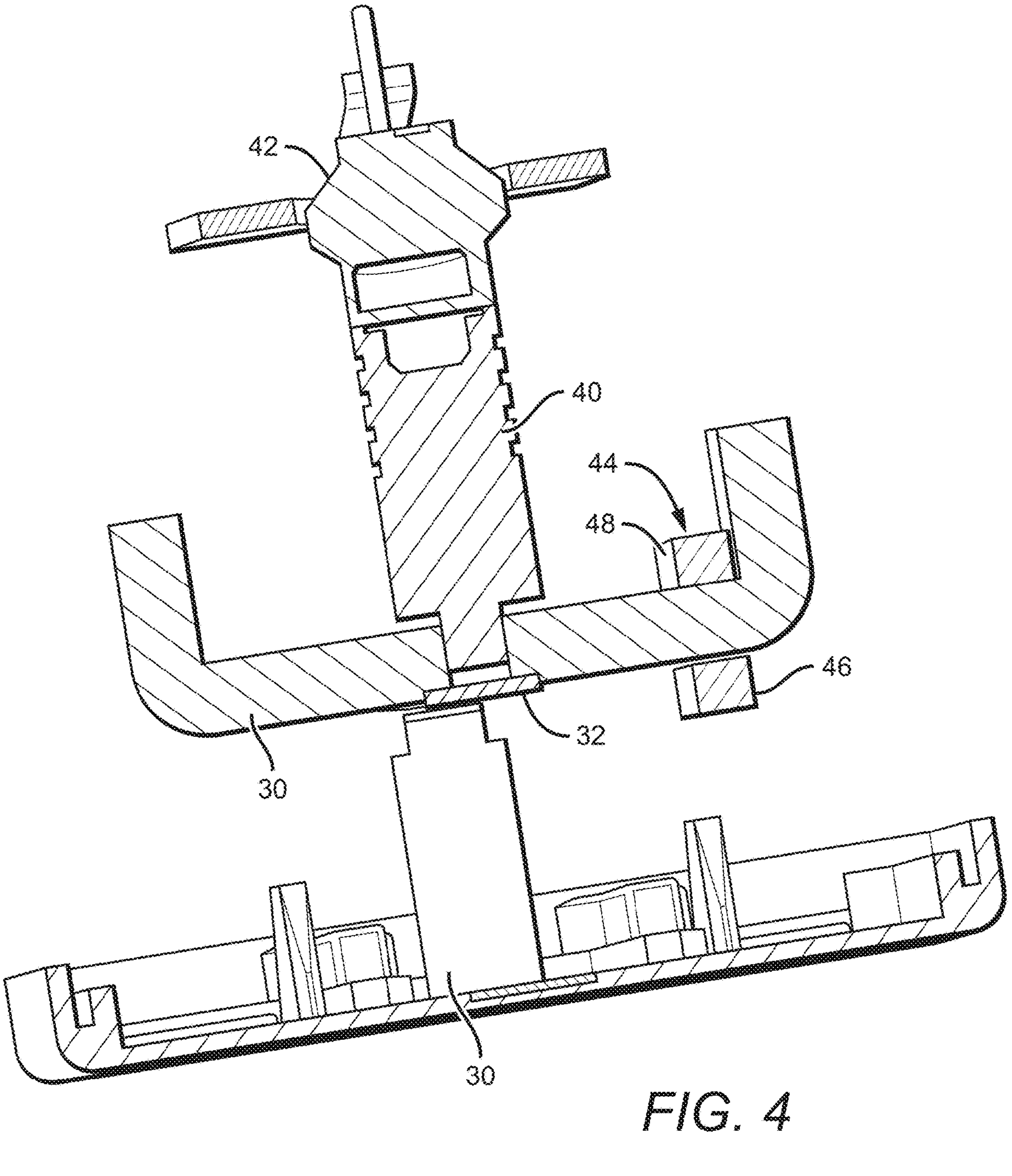
FIG. 4 is a partial sectional view of one embodiment of a fuse device according to the present invention.
Figure 5:
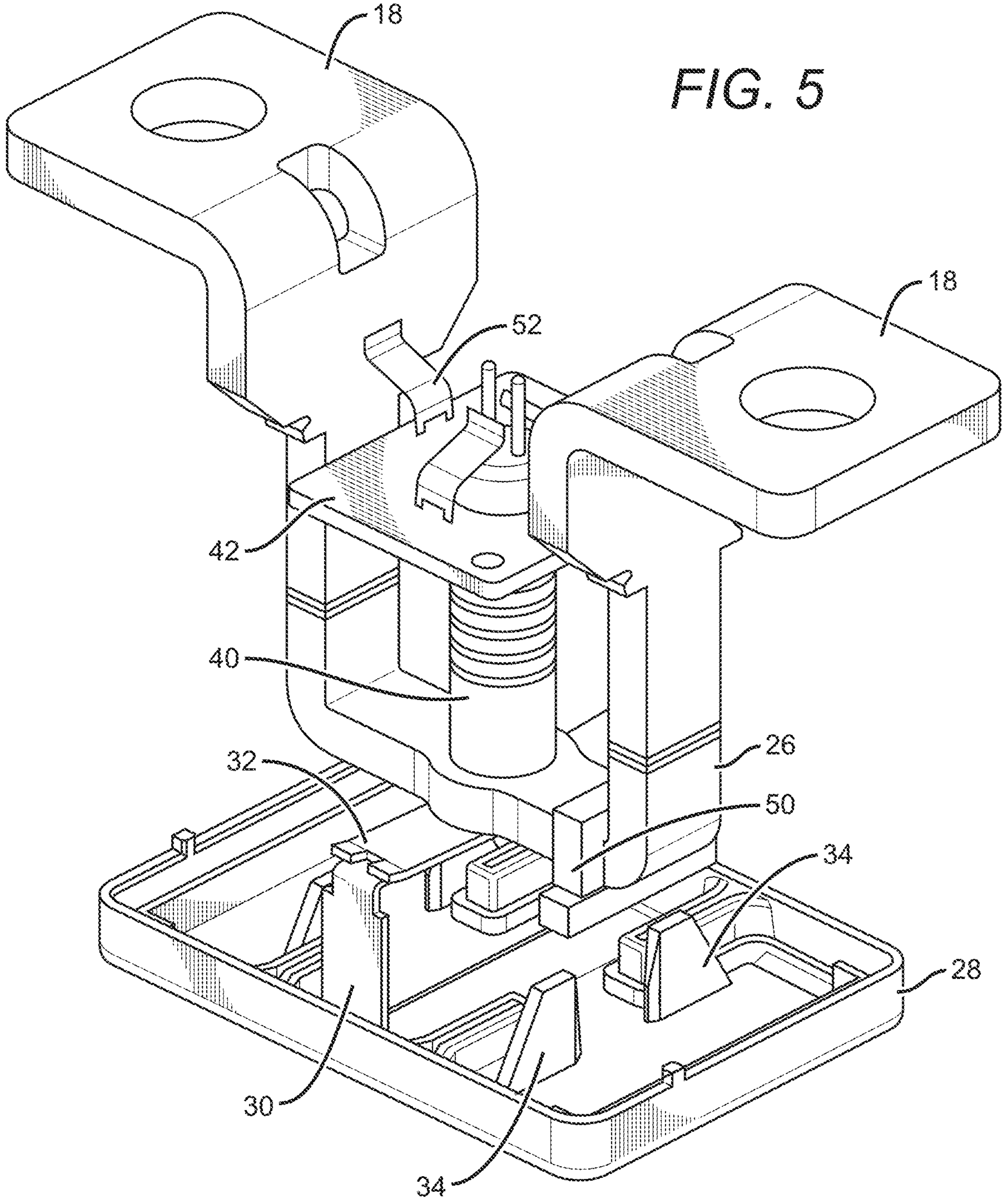
FIG. 5 is a partial perspective view of one embodiment of a fuse device according to the present invention.

In the embodiment shown, the cap assembly 20 seals to the top of the cup 22 to hold the fuse device's internal components and to form an arc chamber as described below. The underside of the cap assembly also comprises a dielectric maze 24 (or labyrinth) as best shown in FIG. 3. The maze 24 provides a series of varying surfaces and channels that help maintain isolation and dielectric strength between the fixed contact 18. Contact arcing and material expulsions during operation can create contact deposits on the inside surfaces of the fuse device 10. Build-up of these materials can result in the formation of an electrical path on the inside surface of the cap assembly 20 that can result in a shorting path between the fixed contact 18. The varying surface of the maze 24 can help prevent build-up of these deposits in a way that would allow formation of an electrical path, thereby maintaining the dielectric withstand voltage required between the fixed contacts after a fuse opening event. The cap assembly 20 and cup 22 also add mechanical strength against arc pressure that occurs during an arcing event, which helps prevent blow apart of the device 10 during an arcing event.

The fuse device 10 also comprises a moveable contact 26 mounted to a guide 28 by a spring support 30 and flat spring 32. During normal operation, the movable contact 26 is held in contact with the fixed contacts 18 to form an electrical path between the fixed contacts 18, through the movable contact 26. During a fuse blown event the movable contact 26 is moved out of contact with the fixed contacts 18, breaking the electrical path between the fixed contacts 18 that normally passes through the movable contact 26.

The spring support 30 holds the flat spring 32 in the desired position so that the flat spring 26 pushes against the movable contact 26 to hold the movable contact 26 in contact with the fixed contacts 18. The flat spring can deflect as a holding force is provided against the movable contact 26, and the holding force is such that it holds the movable contact 26 to the fixed contacts 18 for low and stable contact resistance during normal operation. Many different holding forces can be provided, with some embodiments having a holding force of approximately 3 pounds total or 1.5 pounds for each of the fixed contacts.

The flat spring 32 can be mechanically connected to the movable contact 26 to prevent rotation of the movable contact 26 by Lorentz induced rotation forces as described above. This can eliminate or reduce the friction locking on the movable contact that can change the levitation triggering level (fuse blow event). It is noted that in some embodiments of the present invention, the flat spring 32 need only stop rotation of the movable contact 26 and maintain contact force to the fixed contacts 18. In these embodiments, full bonding of the flat spring 26 to the movable contact 26 may not be necessary. The spring support 30 and flat spring 32 should be made of a made of a rugged material, such as a metal or plastic, with some materials comprising a metal that permits reliable operation of over temperature ranges that would cause less robust materials (such as plastic) to fail.

The guide 28 holds the spring support 30, flat spring 32 and movable contact 26 assembly and can also comprises a catch 34 that traps the movable contact 26 in the down position following a fuse blown event. This prevents the movable contact 26 from bouncing back closed following a fuse blown event, or floating in the fuse device 10, which could cause potential dielectric issues. The guide 28 also covers the bottom of the fuse arc chamber described below.

The fuse device 10 also comprises an internal envelope 36 and magnets 38. The internal envelope 36 holds the magnets 38 in the desired location and the movable contact 26, spring support 30, flat spring 32 and pryo plunger 40 are held in the envelope. The inside surfaces of the envelope 36 also comprise the primary arc chamber and can also include a maze that prevents deposits from forming conductive paths that can result in failure after a fuse blown event. The magnets 38 are arranged to create a high-density magnetic flux across the contacts during an opening (or blown) event to reduce or extinguish high power electrical arcing. The magnets can be arranged to extinguish different levels for arcing, with some embodiments extinguishing arcing of approximately 10 MW.

The fuse device 10 further comprises a squib and printed circuit board (PCB) assembly 42 that is mounted to the cap assembly 20 and arranged to operate on the pyro plunger 40 during a fuse blown event. The squib acts as a pyrotechnic device, and many different squibs can be used that can be arranged in many different ways. In some embodiments, squibs can be used that are conventional automotive air bag initiators of different types. The squib provides the explosive energy in a fuse blown event that causes the plunger 40 to move down and separate the moving contact 26 from the fixed contact 18 against the holding force of the flat spring 32. When the plunger 40 moves the movable contact 26 down, the flat spring 32 will flex until it comes off the spring support 30. The movable contact 26 will then be forced further down by the plunger until it is held at the catch 34 on the guide 28. This holds the fuse device 10 in an open (blown) condition.

The fuse device 10 further comprises a levitation actuator 44 that is arranged to cause the squib/PCB assembly 42 to actuate to blow the fuse device at the desired threshold current level through the contacts. The levitation actuator 44 comprises a lower stationary bar 46 and inverted U-shaped bar 48 that is mounted to the movable contact 26 over the stationary bar 46. The stationary bar 46 can be mounted in many different locations and in many different ways, with the embodiment shown having the stationary bar 46 mounted to the envelope 36 just below the movable contact 26 (best shown in FIG. 3). A space/gap 50 is provided between the stationary bar 46, and the lowest surface of the movable contact 26 and U-shaped bar 48 to allow movement of the movable contact 28 toward the stationary bar 46.

The stationary and U-shaped bars 46, 48 can be make of a ferromagnetic material that amplifies and focusses the magnetic field caused by current flow through the movable contact 26. The fuse device 10 can be arranged to trip or blow at a certain current level passing through the contacts. When this current level is reached, the U-shaped bar 48 generates a pulling force toward the stationary bar 46. This causes the space 50 to close, which at the same time causes the side of the movable contact 26 with the levitation actuator 44 to separate from its one of the fixed contacts 18. This causes increased resistance (such as by arcing) at this separation between the movable contact 26 and the one of the fixed contacts 18. This increased resistance causes the current at the fixed contacts 18 to seek a path of lower resistance. In the fuse device 10 this path of lower resistance is through the connection the squib leads 52 (best shown in FIG. 5). The current then actuates the squib assembly 42, causing the plunger 40 to move the movable contact 26 out of contact with the fixed contacts 18 and to be held at the catch 34. This holds the movable contact 26, and the fuse device 10, in the open or blown position.

In the embodiment described above, the fuse device is blown through an internal feature arrangement that automatically signals the squib to activate when the predetermined (trip) current level is reached through the contacts. This automatic tripping occurs without the need for an external signal, and is referred to "passive" activation. It is understood, however, that fuse devices according to the present invention can also be activated by many other internal passive signals, and by external "active" signals.

Figure 6:
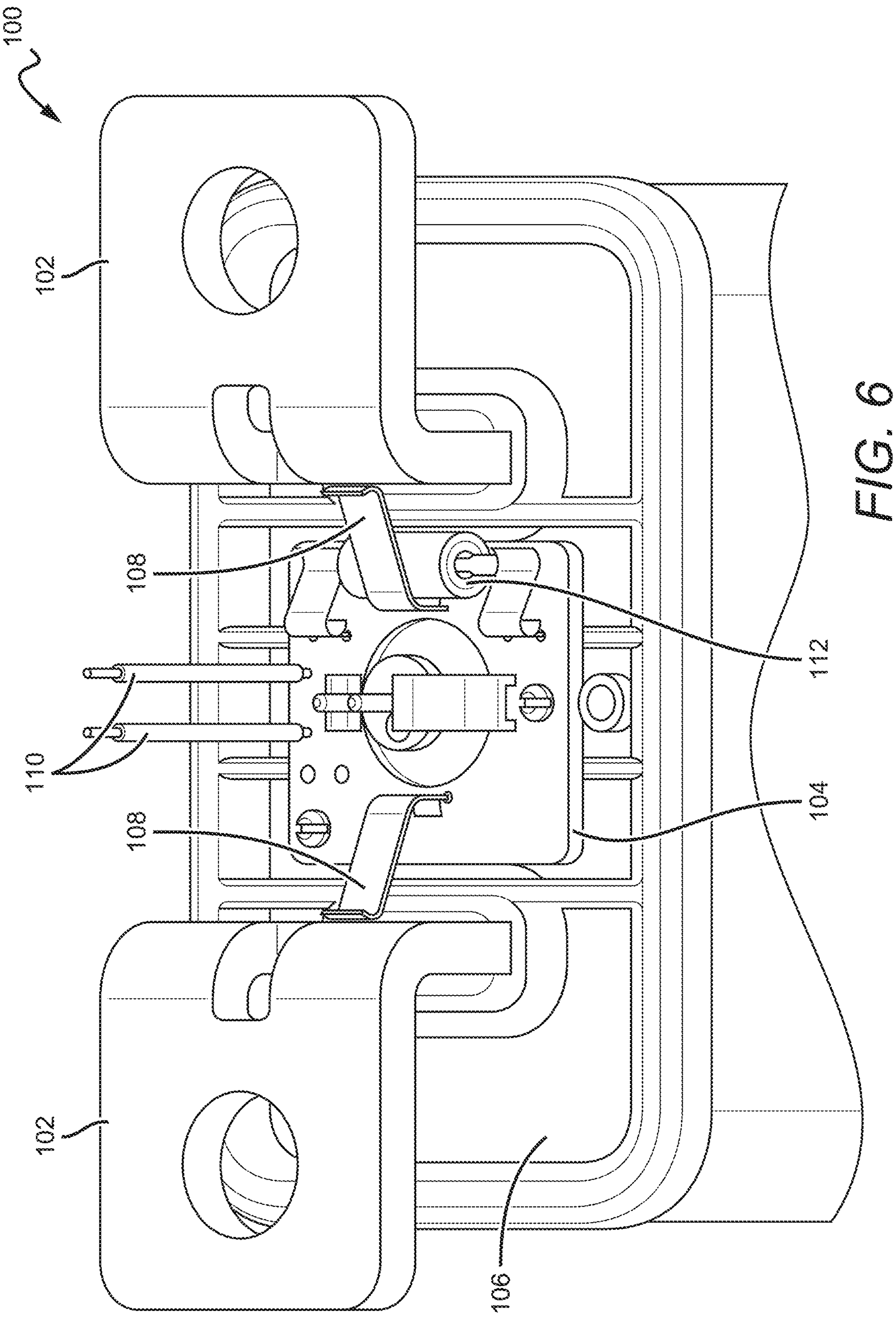
FIG. 6 is another partial perspective view of one embodiment of a fuse device according to the present invention.
Figure 10:
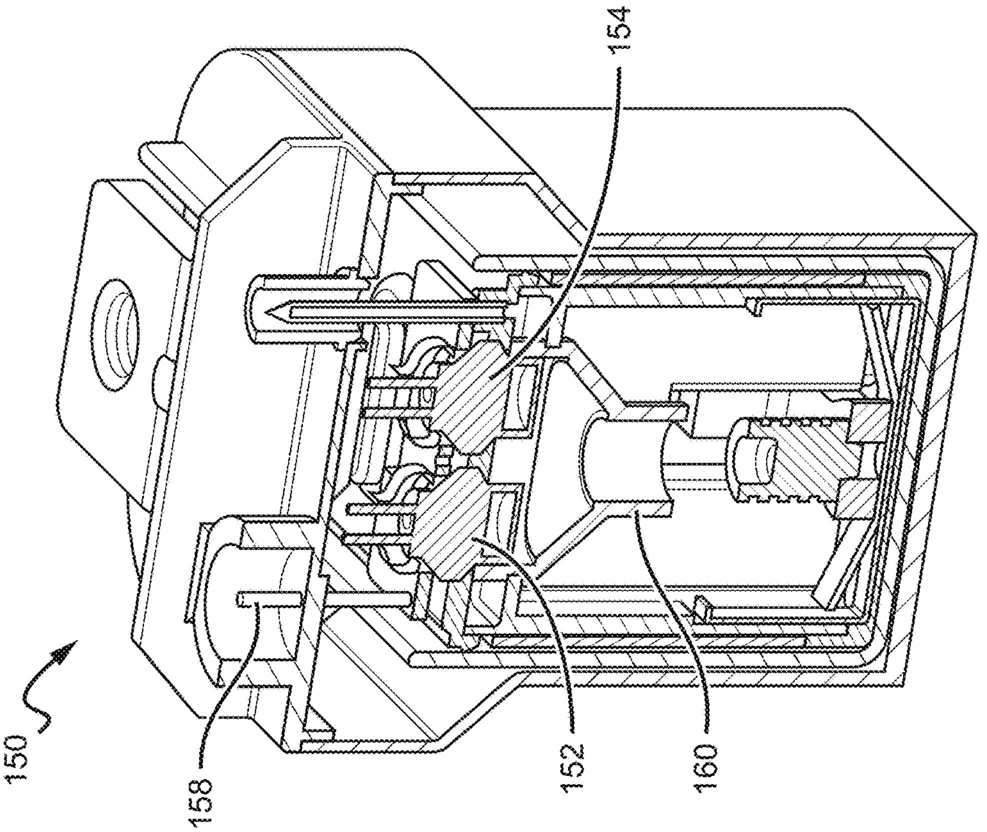
FIG. 10 is a partial perspective view of another embodiment of a fuse device according to the present invention.
Figure 9:
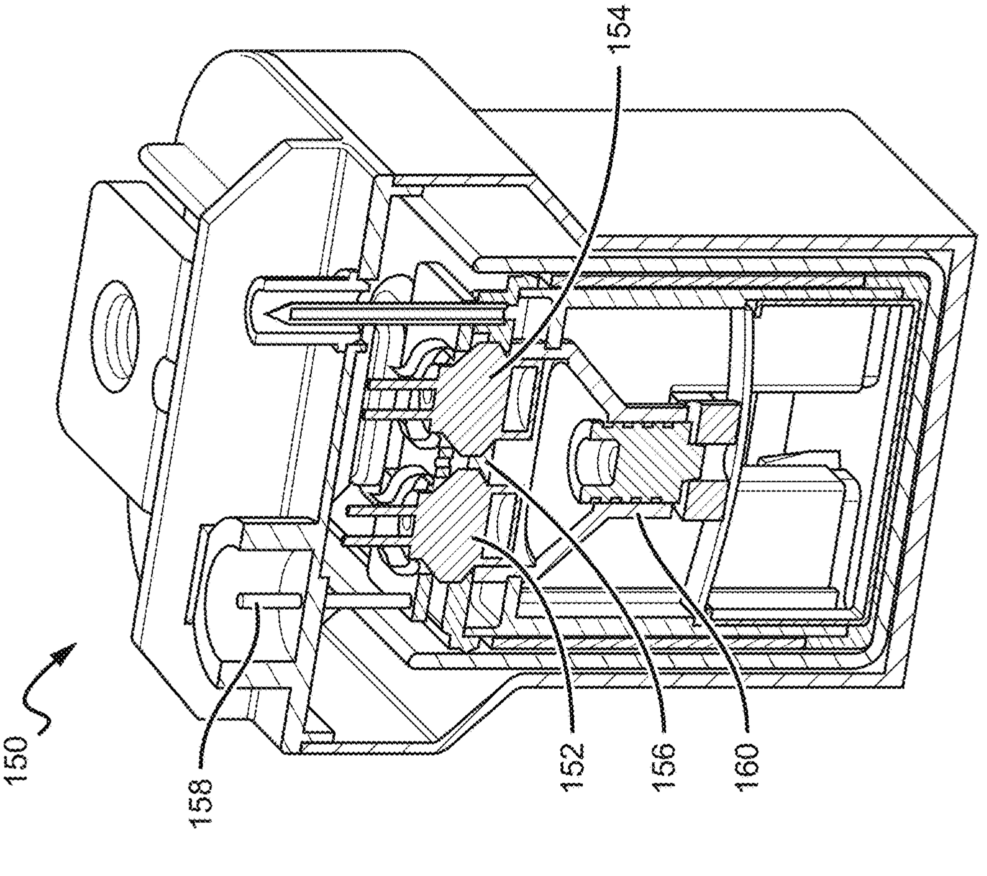
FIG. 9 is another perspective sectional view of another embodiment of a fuse device according to the present invention.

Referring now to FIG. 6 is conjunction with FIG. 7, an arrangement is shown that allows for passive internal activation as described above, along with active external activation. FIG. 6 shows a fuse device 100 with fixed contacts 102 and squib/PCB assembly 104 mounted to a cap assembly 106. In this embodiment first squib leads 108 are shown that carry an activation signal from the internal components of the fuse device 100 as described above.

The squib/PCB assembly 104 also comprises low voltage power control wires 110 that are used to connect to an external source for active activation of the squib. This activation could be controlled by any one or more different external features or systems that could be customized to the particular fuse device application. The squib/PCB assembly 104 also comprises a coil 112 and a reed switch 113. The coil 112 generates a magnetic field that can close the reed switch 113, causing activation of the squib by the current passing between the contacts or terminals 102.

This embodiment of the present invention can comprise many different electronic elements arranged in many different ways to provide the active activation signals. FIG. 7 shows one embodiment of a circuit 120 that is arranged to provide the active activation signal to a fuse device according to the present invention. The activation signal is provided from low voltage power source 124, that is applied to a coil 126. The coil 126 in turn generate a magnetic field that causes closure of a reed switch 128. This provides a low resistance path for the signal applied to the fixed contacts 130, which causes activation of the squib 132. It is understood that this is only one of the many active signal activation circuits that can be used according to the present invention, and that these circuits can be used in conjunction with the passive activation arrangement described herein.

FIGS. 8-12 show another embodiment of a fuse device 150 according to the present invention that can also be activated by and internal passive signal or an external active signal. The fuse device 150 comprises first and second squibs 152, 154 mounted to a PCB 156. The first squib 152 is arranged to activate upon receipt of external active signal, and second squib 154 is arranged to activate as described above from an internal passive signal. The fuse device is arranged similar to the fuse device 10 described above. In this embodiment, however, active trigger connection pins 158 are included for connection to the external device providing the active activation signal. The external device can provide different types of activation signals in different embodiments, with the embodiment shown arranged for activation by a low voltage signal.

The fuse device 150 also comprises a squib funnel 160 with the first and second squibs 152, 154 arranged at the larger upper opening of the funnel 160, and the plunger 162 arranged at the lower opening. The force from the activation of either of the first or second squibs 152, 154 is directed to the plunger 162 by the funnel 160. This causes 112 the plunger to move down and force the movable contact out of the contact with the fixed contacts as described above.

Figure 13:
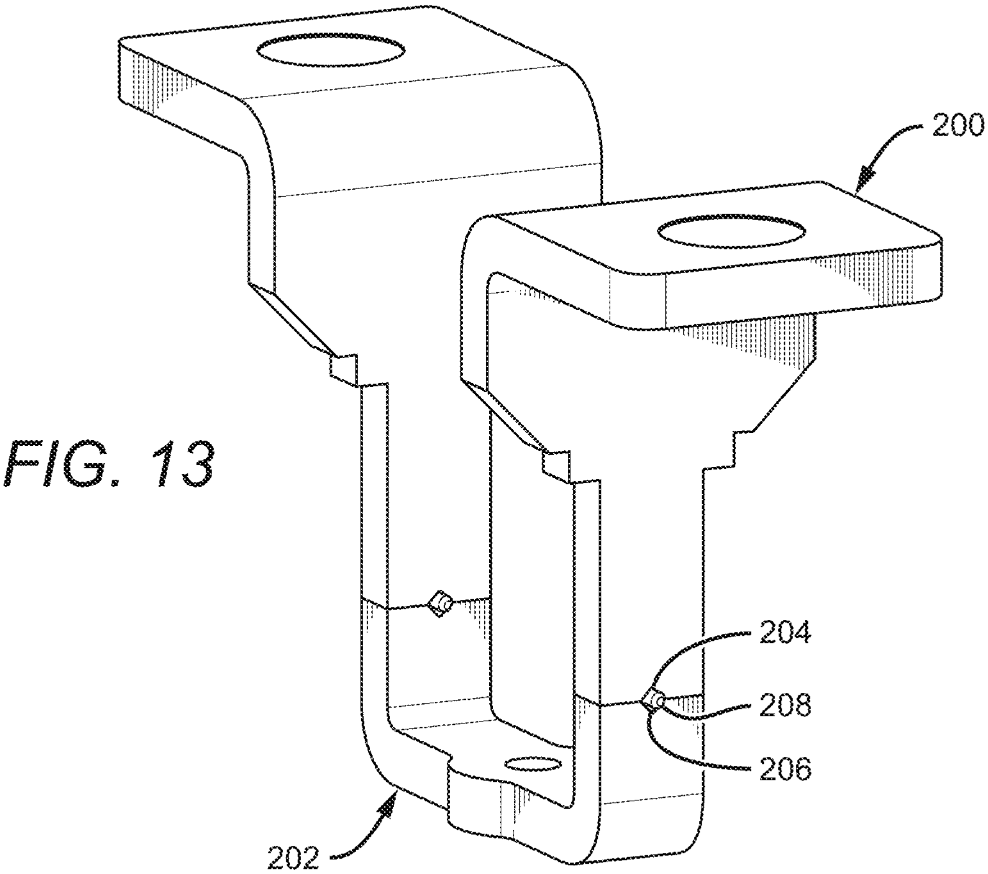
FIG. 13, is a partial perspective view of another embodiment of the contacts in a fuse device according to the present invention.
Figure 14:
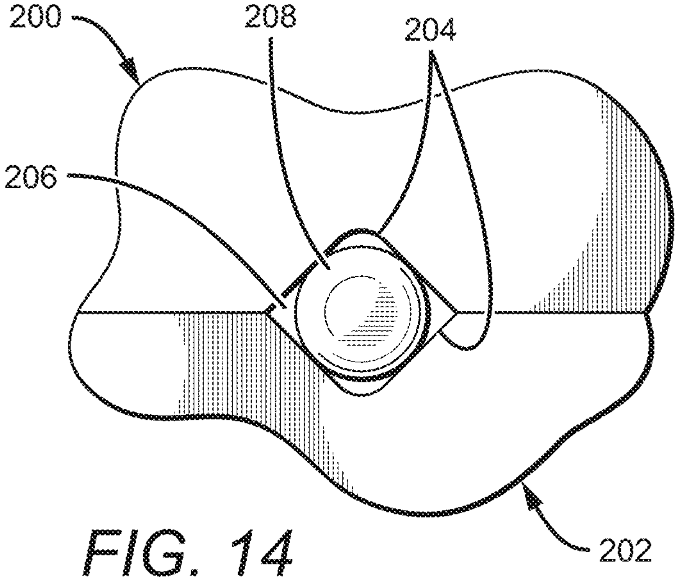
FIG. 14 is a partial side view of another embodiment of the contacts in a fuse device according to the present invention.
Figure 15:
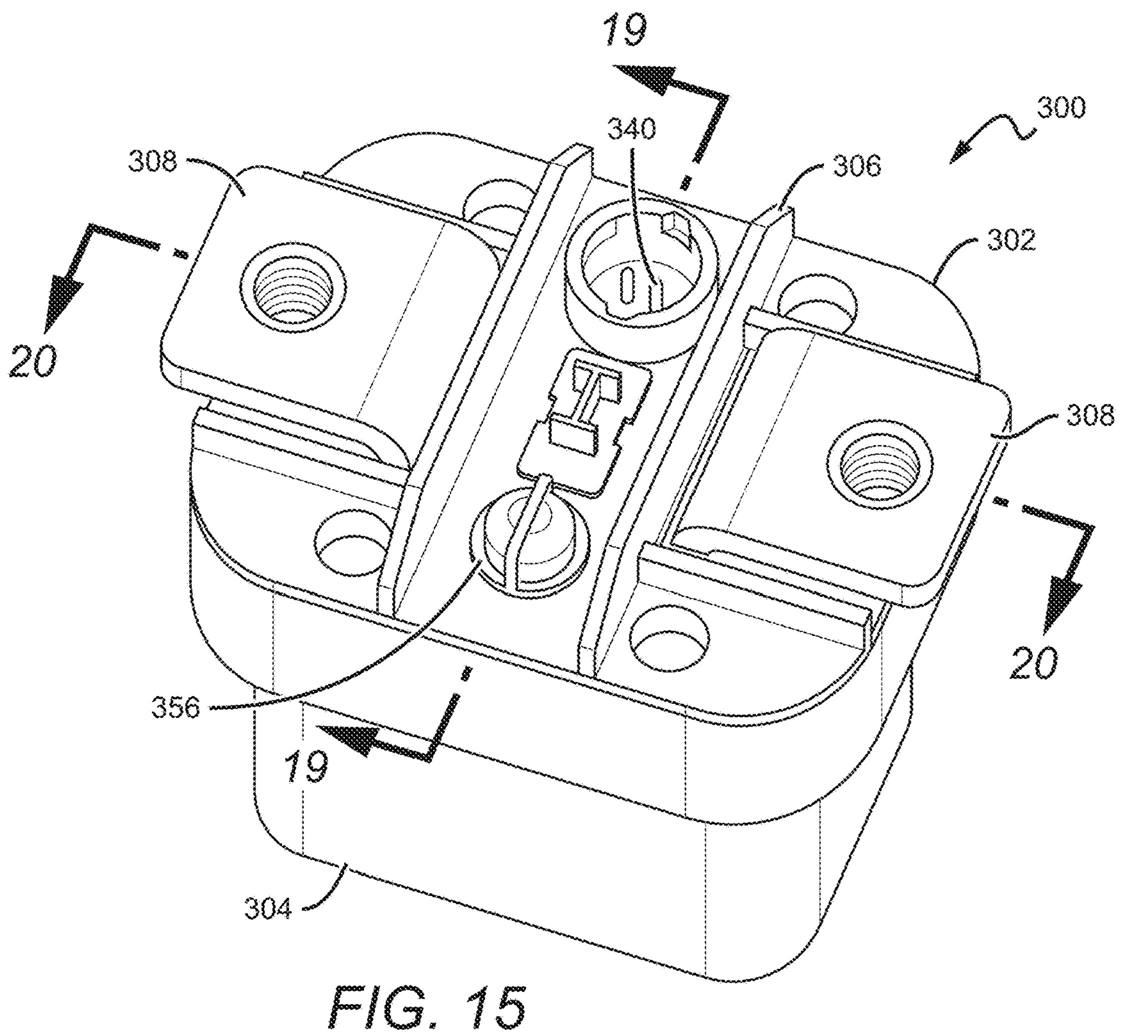
FIG. 15 is a perspective view of one embodiment of a fuse device according to the present invention.
Figure 16:
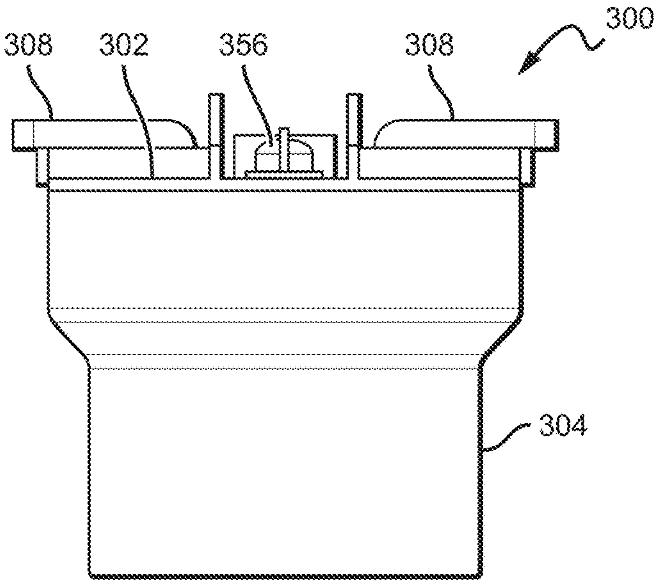
FIG. 16 is a front view of the fuse device shown in FIG. 17.
Figure 17:
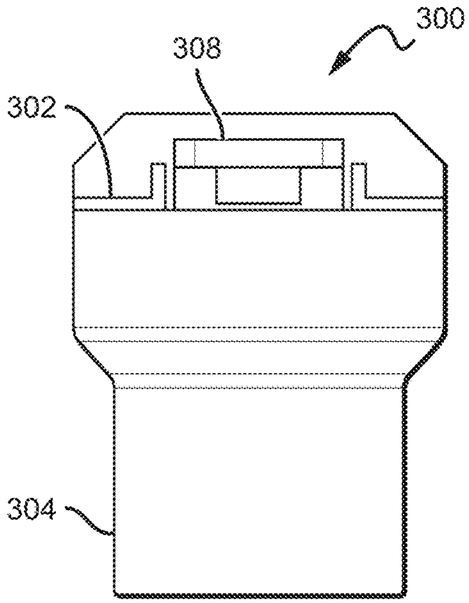
FIG. 17 is a side view of the fuse device shown in FIG. 15.
Figure 18:
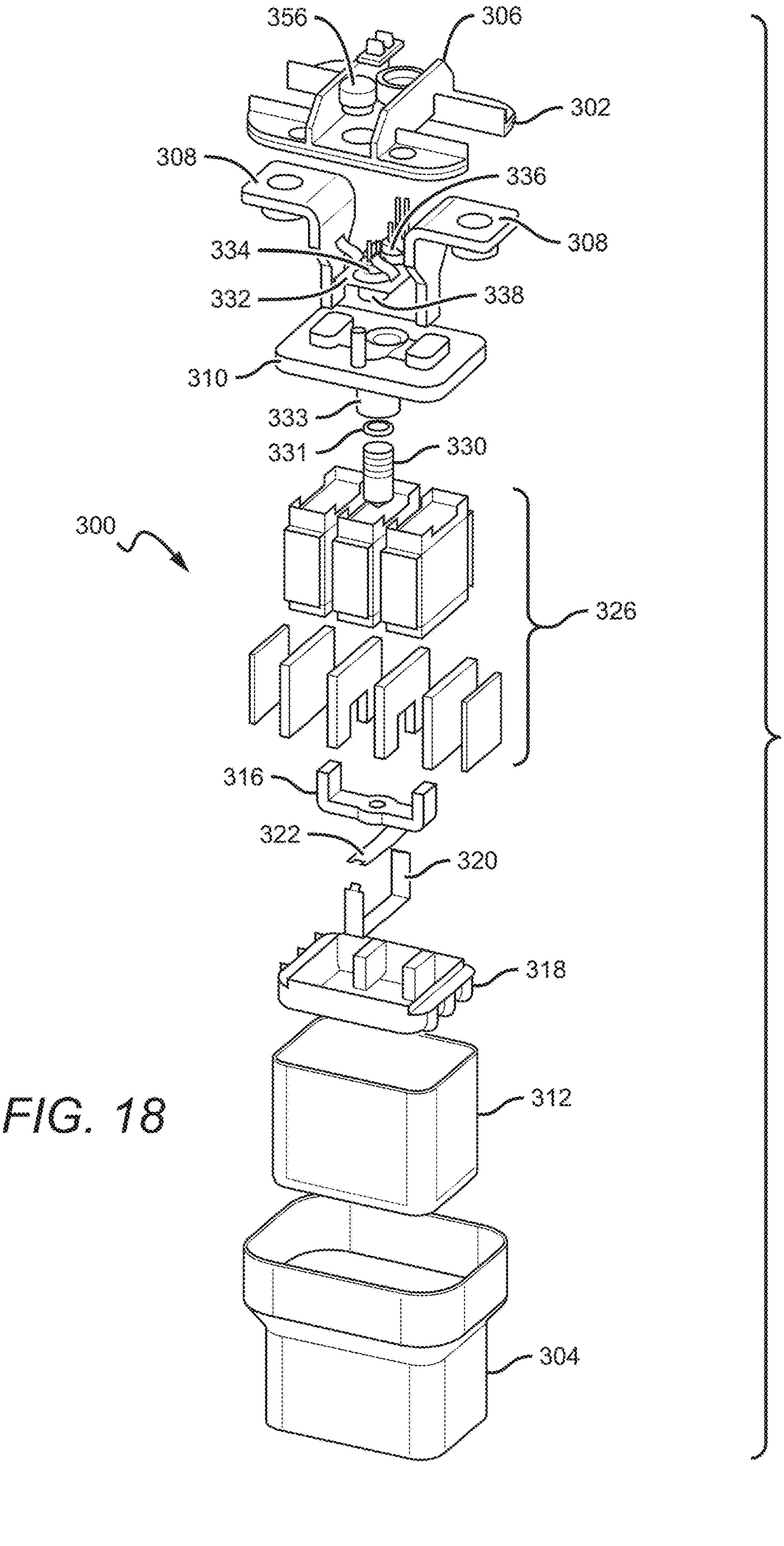
FIG. 18 is an exploded view of the fuse device shown in FIG. 15.
Figure 19:
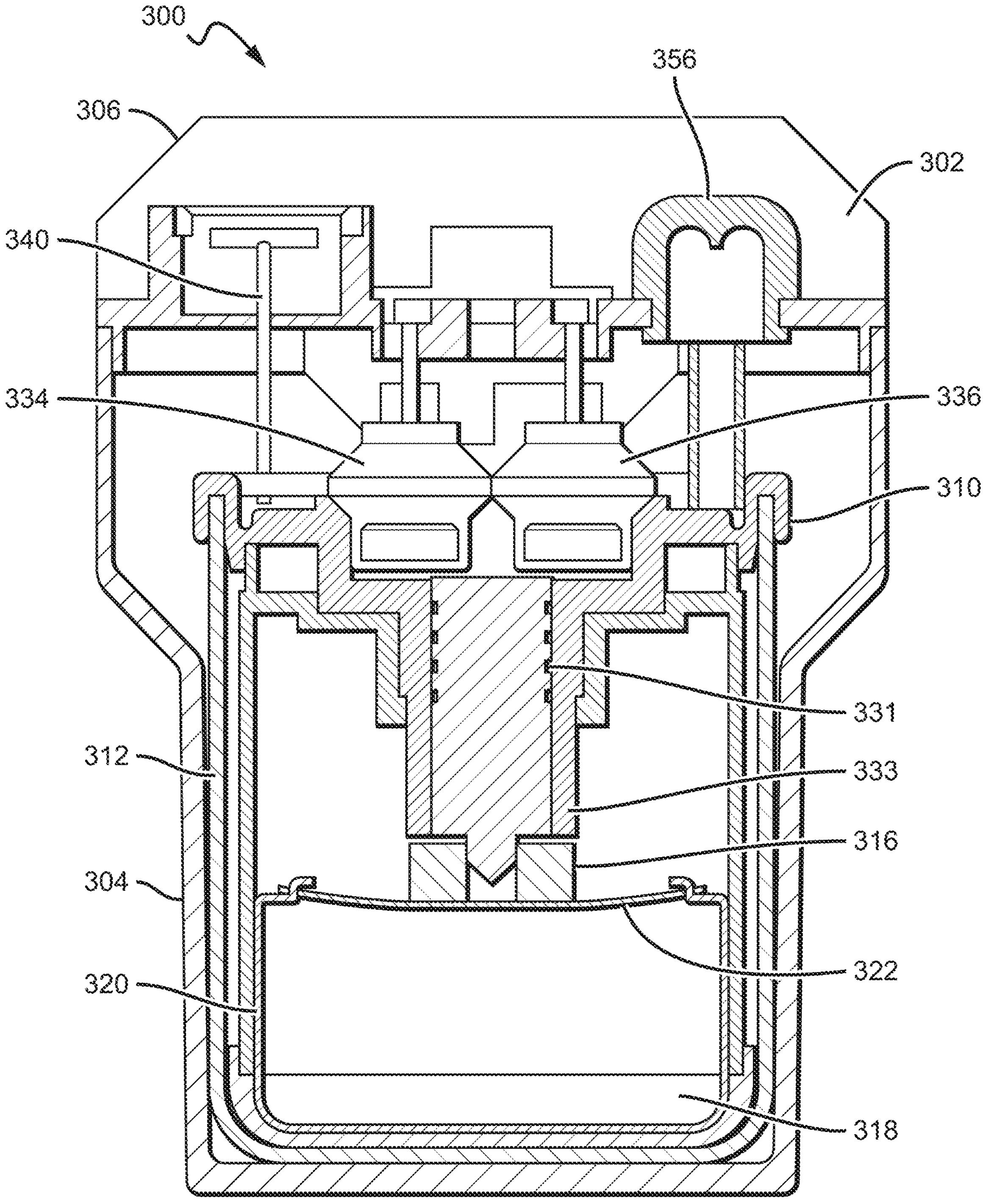
FIG. 19 is a sectional view of the fuse device shown in FIG. 15, taken along section lines 19-19.

As described above, the fuse devices according to the present invention can have a flat spring and spring support to prevent contact rotation under Lorentz force. Other embodiments can comprise other features to reduce or eliminate this problem. FIGS. 13 and 14 show another embodiment of fixed contact 200 and movable contact 202 for reducing or eliminating this rotation. In the embodiment shown, the contact area between the fixed contacts 200 and movable contact 202 have opposing V-shaped notches 204 that form a square shaped space 206. A pin or roller 208 is held that resists sideways motion of the fixed and movable contacts in relation to one another. The roller 208 can comprise many different materials with some embodiments comprising a non-conductive material.

It is understood that the fuse device embodiments according to the present invention can comprise many other features to provide reliable operation under different operating conditions. Referring again to FIGS. 2, 3 and 5, the fixed contacts 18 and the movable contact 26 can be made of many conductive materials or combinations for conductive materials such as metals. In some embodiments, they can be made entirely of or primarily of copper (Au). In some embodiments, the surfaces where the fixed contact 18 meet and are in contact with the surfaces of the movable contact 26 can experience small points of fusing or micro-welds at currents below the desired trip (or fuse blown) current. This can cause sticking between the surfaces, which can result in the need for a higher force to separate the two. This can result in an unpredictable (or higher) trip current to separate the contacts.

To reduce or eliminate this problem, the surfaces where the fixed contacts 18 and movable contacts meet can comprise or be coated by a material that resists the fusing and micro-welds between the contacts. Many different materials can be used, including but not limited to silver alloys such as silver tin oxide (AgSnO) or silver carbide (AgC or $Ag_2C_s$), on the opposing surfaces of the fixed contacts 18 and movable contact 26. The additional of this material can reduce or eliminate the sticking between the contacts. It is understood that the same or different materials can be included on the opposing surfaces.

The use of this material on the contacts can provide the additional advantage of allowing for use of the contacts in open (or non-hermetic) arrangements where there is a danger of oxidation to the contacts. This material can reduce or eliminate the oxidation from forming on the meeting surfaces of the contacts.

FIGS. 15-20 show another embodiment of fuse device 300 according to the present invention having many features similar to the fuse device 10 shown in FIGS. 1-5 and described above. Like above, the envelope that contains the internal components of the fuse device 300 generally comprises a cover 302 and a housing 304. The housing 304 contains most of the internal components and can provide specified mounting features for installation. The cover 302 can provide a barrier to protect the fuse device features and components below and to provide mechanical strength.

The fuse device comprises fixed contacts 308 that are configured such that the various internal components of the fuse device 300 can electrically connected to an external electrical system or device. This allows the fuse device 300 to function to complete an electrical circuit of to break an electrical circuit as described herein.

When not interacting with any of the other components internal to the housing 304, the fixed contacts 308 are otherwise electrically isolated from one another. The fixed contacts 308 can comprise the materials described above and can comprise a single or multi-portion structures as described above. The fixed contacts 308 extend from the cover 302, and are available for connection to an electrical system. The lower portion of the contacts 308 pass through the cover 302 to interact with the housing's internal components. The cover 12 can also comprise vertical walls 306 that function as external barriers between the contacts 308 to help maintain isolation between the contacts 308 during operation and during an interruption event.

The fuse device 300 also comprises a cap assembly 310 that can be mounted to a cup 312 to form a fuse device body that can comprise any shape. In some embodiments, there can be a hermetic seal between the cap assembly 310 and cup 312 using the methods described above. The fixed contacts 308 protrude through the cap assembly 310 and pass from the fuse device's internal chamber formed by the cup 312 and cap assembly 310 so that they can be accessed for use. The cap assembly 310 forms an airtight or hermetic seal around the contacts 308 and the cap assembly 310 can be made of many different materials described above. The cap assembly 310 and cup 312 can also be at least partially filled with an electronegative gas and other materials also as described above.

Figure 20:
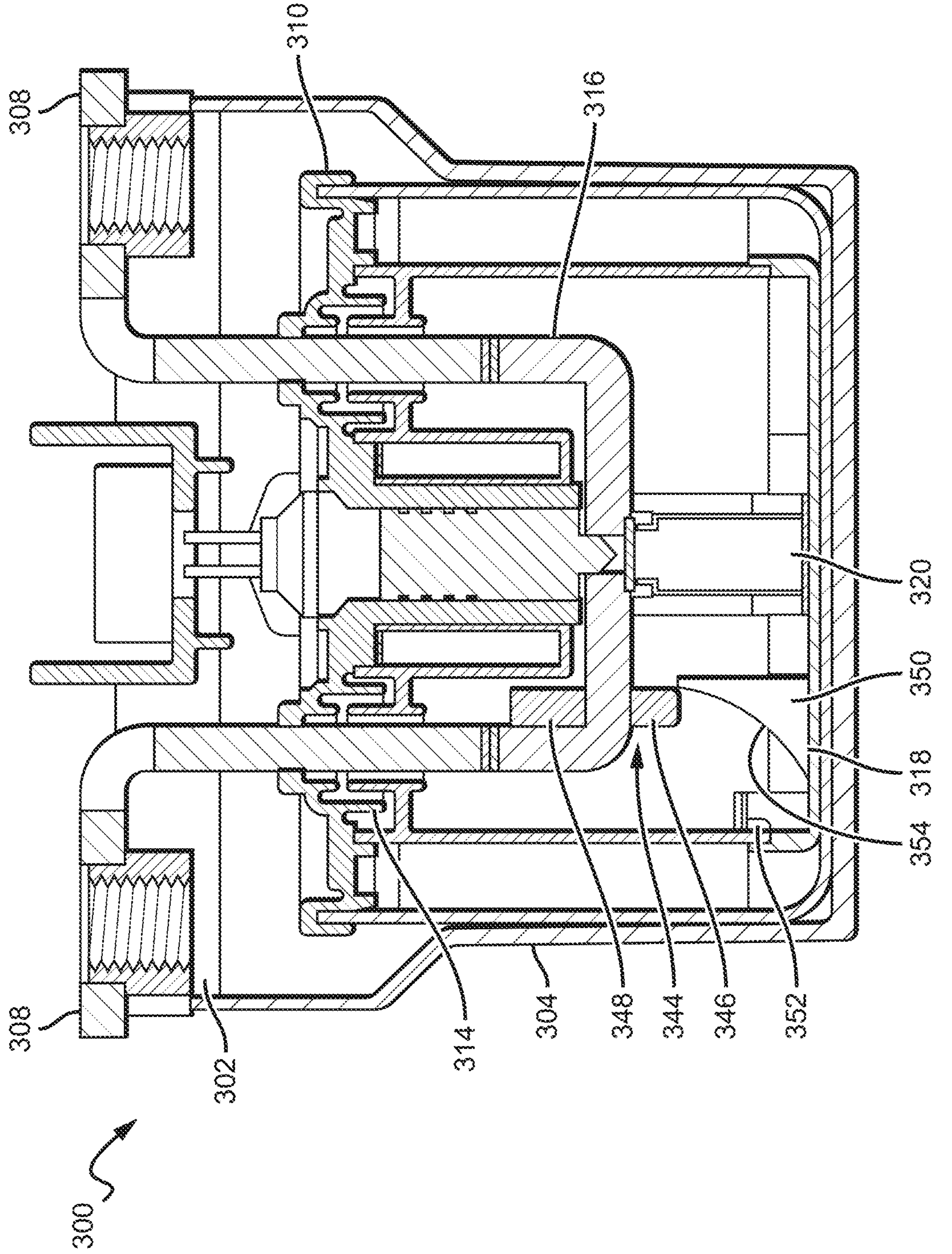
FIG. 20 is a sectional view of the fuse device shown in FIG. 15, taken along section lines 20-20.

In the embodiment shown, the cap assembly 310 seals to the top of the cup 312 to hold the fuse device's internal components and to form an arc. The underside of the cap assembly 310 also comprises a dielectric maze 314 (or labyrinth) as best shown in FIG. 20. The maze 314 provides a series of varying surfaces and channels that help maintain isolation and dielectric strength between the fixed contact 308. The cap assembly 310 and cup 312 also add mechanical strength against arc pressure that occurs during an arcing event.

The fuse device 300 also comprises a moveable contact 316 mounted to a guide 318 by a spring support 320 and flat spring 322, that are arranged to operate in the same or similar manner as described above. The flat spring 322 can be mechanically connected to the movable contact 316 to prevent rotation of the movable contact 316 by Lorentz induced rotation forces as described above. The spring support 320 and flat spring 322 should be made of a made of a rugged material, such as metal, the permits reliable operation of over temperature ranges. The guide 318 holds the spring support 320, flat spring 322 and movable contact 316 and can also comprises a catch (i.e. capture bar) as described below that traps the movable contact 316 in the down position following a fuse blown event.

The fuse device 300 also comprises an internal envelope 326 and arc magnets 328 with the internal envelope 326 holding the magnets 338 in the desired location. The movable contact 316, spring support 320, flat spring 322 and pyro plunger 330 are also held in the envelope 326. Like above, the inside surfaces of the envelope 326 also comprise the primary arc chamber and can also include a maze the prevents deposits from forming conductive paths that can result in failure after a fuse blown event.

The fuse device 300 further comprises a squib and printed circuit board (PCB) assembly 332 that is mounted to the cap assembly 310 and arranged to operate on the pyro plunger 330 during a fuse blown event. First and second squibs 334, 336 are mounted to a PCB 338. As described above, the first squib 334 can be arranged to activate upon receipt of external active signal, and second squib 336 can be arranged to activate as described above from an internal passive signal. Active trigger connection pins 340 are included for connection to the external device providing the active activation signal. The external device can provide different types of activation signals in different embodiments, with some embodiments arranged for activation by a low voltage signal.

It is noted that the plunger 330 can be arranged in many different ways and with different features to provide consistent and reliable operation. In some embodiments, one or more seal rings 331 can be included on the plunger 330, between the plunger 330 and that plunger opening 333. This provide a good seal between the two, with the rings 331 compensating for variances in manufacturing. The result is that the plunger opens under a consistent and predictable force. The rings 331 can be made of many materials and can be in many locations, with at least one of the rings being made of silicone and being located at the top of the plunger 330.

It is noted that the fuse device 300 can be arranged to operate with two squibs or with a single squib. In the single squib arrangement, a plug can be included in the unused squib opening. For example, in arrangements where only passive activation is desired, only the second squib 336 can be included, and a plug can be mounted in the opening of the first squib. In arrangements where only external active signal activation is desired, the first squib 334 can be included and a plug can be mounted in the opening for the second squib. This provides flexibility in the uses for the fuse device 300.

The active trigger connection pins 340 can be accessed though the cover 302 with standard squib connectors. The cover also comprises a test access window 341 and allows for direct electrical access to the first and second squibs 334, 336 for final testing during manufacturing. It is understood that in other embodiments, the first and second squibs can also be accessed for other purposes, such as trouble shooting.

The fuse device 300 further comprises a levitation actuator 344 (shown in FIG. 20) that is arranged similar to the levitation actuator 44 described above with reference to FIGS. 1-5. The levitation actuator 344 operates to cause the second squib 336 on the squib and PCB assembly 332 to actuate to blow the fuse device 300 at the desired current passing through the contacts as described above. The levitation actuator comprises a lower stationary bar 346 and inverted U-shaped bar 348 mounted to the movable contact 316, over the stationary bar 346, with a space between the two.

The stationary and U-shaped bars 346, 348 can be make of a ferromagnetic material that amplifies and focusses the magnetic field cause by current flow through the movable contact 316. When this current level is reached, the U-shaped bar 348 generates a pulling force toward the stationary bar 346. Which causes separation of the movable contact 316 and one of the fixed contacts 308. This causes increased resistance between the fixed and movable contacts, which in turn causes current to pass to and activate the second squib 336, causing the plunger 330 to move the movable contact 336 out of contact with the fixed contacts 308 to the open or blown position.

The fuse device 300 further comprises a ramp 350 and capture bar 352 that are also mounted to the guide 318. The ramp 350 work with the stationary bar 346 (and the U-shaped bar in some embodiments) to move the stationary bar to the side during a fuse blown event, to provide an increase in the opening gap between the fixed contacts 308 and the movable contact 336. As the movable contact 336 moves down toward the guide 318 during a fuse blown event, the ramp 350 the stationary bar 346 rides on the curved surface 354 of the ramp 350 to move the stationary bar 346 in the direction of the curved surface 354. This causes the stationary bar 346 to move to the vertical leg of the of the movable contact 336, and off the lower surface of the movable contact 336. In this position, the stationary bar 346 does not interfere with the movable contact 336 moving the maximum distance to the guide 318, providing the maximum separation between the fixed contacts 308 and movable contact 336. The capture bar 352 can capture that stationary bar 346 at the guide 318 to hold the movable contact 336 at the guide 318 following a fuse blown event.

The fuse device 300 further comprises a gas diverter cap 356 that is mounted to the cover 302, over a gas pressure tube 358. During a fuse blown event, excess gasses can build inside the fuse device 300. The gas pressure tube 358 provides a path from inside of the fuse device 300 to under the gas diverter cap 356. This provides a path for gasses from within the fuse device to diffuse under the cap 356 to reduce the likelihood that the fuse device 300 may blow apart during a fuse blown event.

Figure 21:
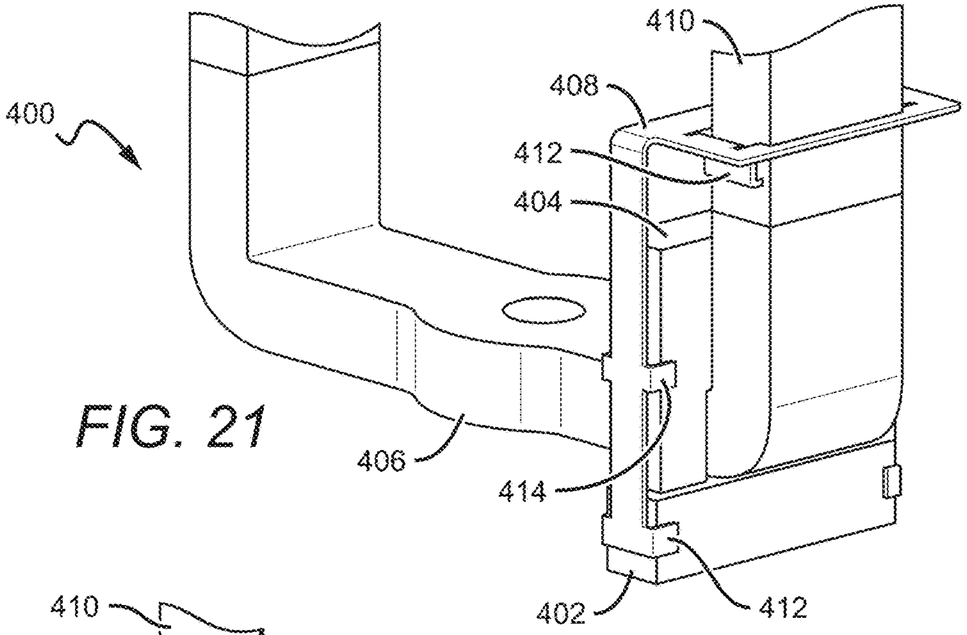
FIG. 21 is a perspective view of one embodiment of a levitation actuator according to the present invention.
Figure 22:
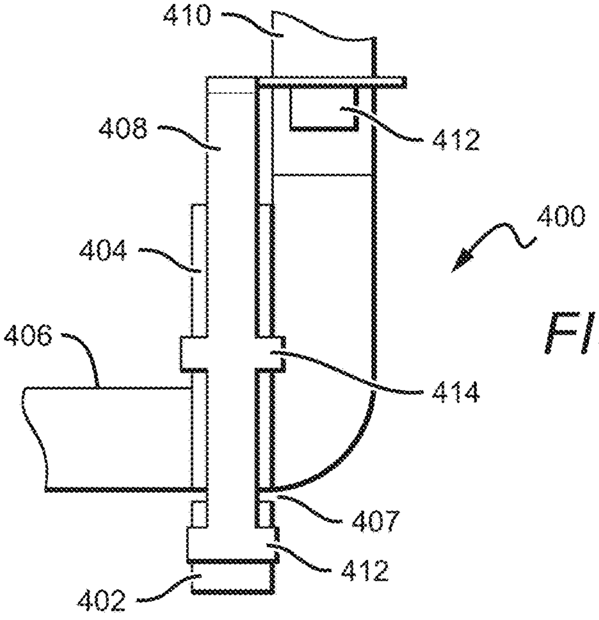
FIG. 22 is a side view of the levitation actuator shown in FIG. 21.

It is understood that the levitation actuators according to the present invention can be arranged in many different ways and with different features. FIGS. 21 and 22 show another embodiment of levitation actuator 400 according to the present invention that can comprise a lower stationary bar 402 and an inverted U-shaped bar 404 that is mounted to a movable contact 406 over the stationary bar 402. A space/gap 407 is left between the lower bar 402 and the U-shaped bar 404, with a space also between the lower surface of the movable contact 406 and lower bar 402.

In this embodiment, a mounting bracket (or retainer) 408 is included that is fixed at its top to the fixed contact 410, and is fixed at its bottom to the stationary bar 402. This results in the stationary bar 402 being mounted to the fixed contact 410 by the bracket 408. Many different mechanisms can be used to fix the bracket in place, with the embodiment shown using tabs 412 that can be bonded to the surface below using known mounting methods.

The bracket 408 also includes guides 414 around the U-shaped bar 404 which are not fixed to the U-shaped bar 404, but instead guide movement of the U-shaped bar. At and elevated currents, the magnetic forces generated in the stationary bar 402 and the U-shaped bar 404, pulls the U-shaped bar 404 toward the stationary bar 402. The U-shaped bar 404 moves along the guides 414 to close the gap 407, which causes movement of the movable contact 406 toward the stationary bar 402, separating the movable contact 406 and the fixed contact 410. This in turn causes an electrical signal to be sent to the squib to generate a fuse blown event. The force provided during this fuse blown event can cause separation of the bracket 408 from the stationary bar 402 or the fixed contact, or can cause the bracket 408 to break. When this occurs, with movable contact 406 can be free to move in response to its fuse blown position out of contact with the fixed contact(s) 410.

Figure 23:
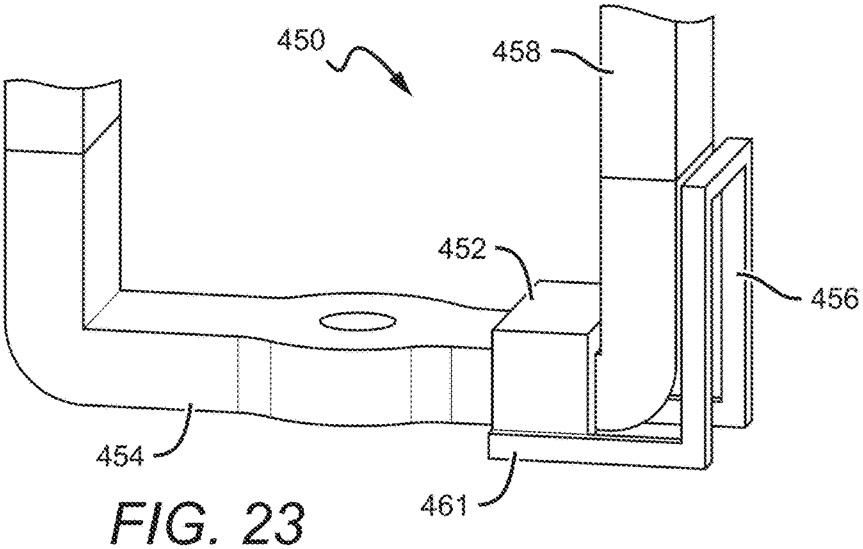
FIG. 23 is perspective view of another embodiment of a levitation actuator according to the present invention.
Figure 24:
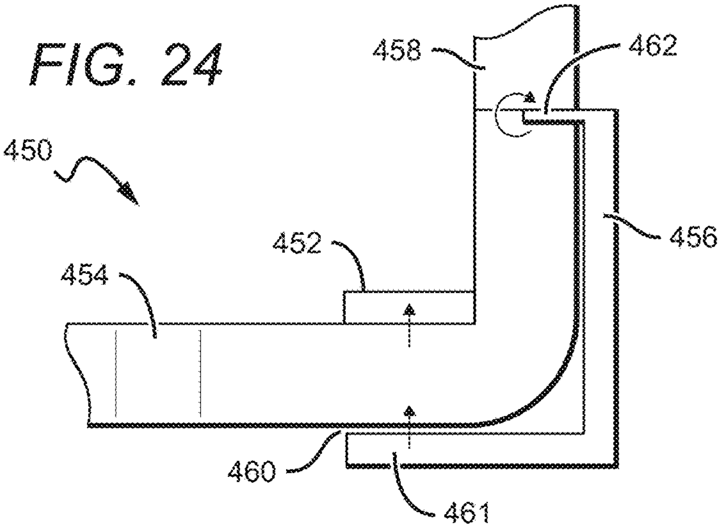
FIG. 24 is a side view o the levitation actuator shown in FIG. 23.

FIGS. 23 and 24 show another embodiment of a levitation actuator 450 according to the present invention. In this embodiment, a U-shaped bar 452 is mounted to the movable contact 454 and fixed contact 458, with the U-shaped bar 452 being arranged similar to the ones described above and being made of the same materials. An L-shaped prybar 456 is included that spans from the gap between the movable contact 454 and fixed contact 458, to the below the bottom surface of the movable contact 454. A gap 460 is included between the bottom surface of the movable contact 454 and the portion of the prybar 452 below. The prybar 456 further comprises a prybar tip 462 that is arranged in the gap between the fixed contact 458 and movable contact 454.

The prybar 456 includes at least a movable iron portion 461 below the U-shaped bar 452 that is made of one of the materials described above that generates a magnetic field in the presence of a current through the contacts 454, 458. The U-shaped bar 452 is also made of a material that similarly generates a magnetic field. This draws the movable iron portion 460 toward the U-shaped bar 452 and at the desired elevated current through the contacts 454, 458 causes the closure of the gap 460 by movement of the portion 460 to the U-shaped bar 452. Closure of the gap in turn causes a "prybar" motion at the prybar tip 462 that causes separation of the movable contact 454 from the fixed contact 458. This results in increased resistance between the movable contact 454 and fixed contact, with an electrical signal being sent to the squib to cause a fuse blown event.

Figure 25:
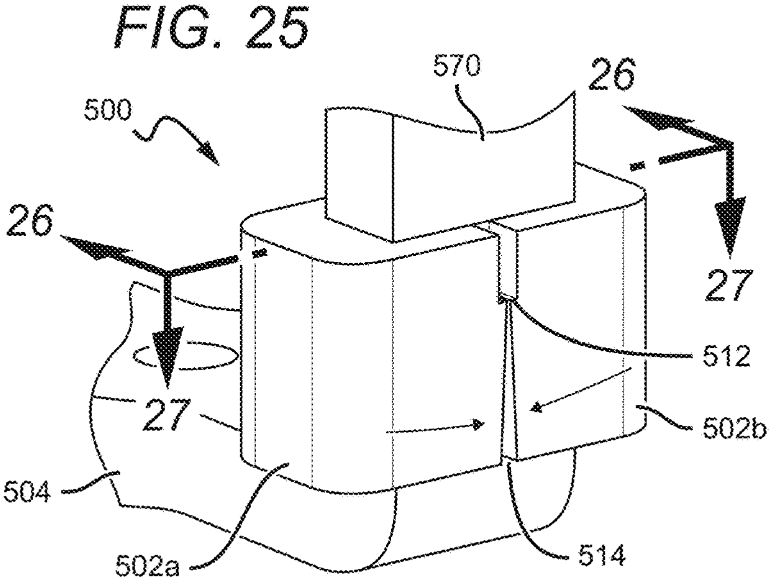
FIG. 25 is a perspective view of another embodiment of a levitation actuator according to the present invention.
Figure 26:
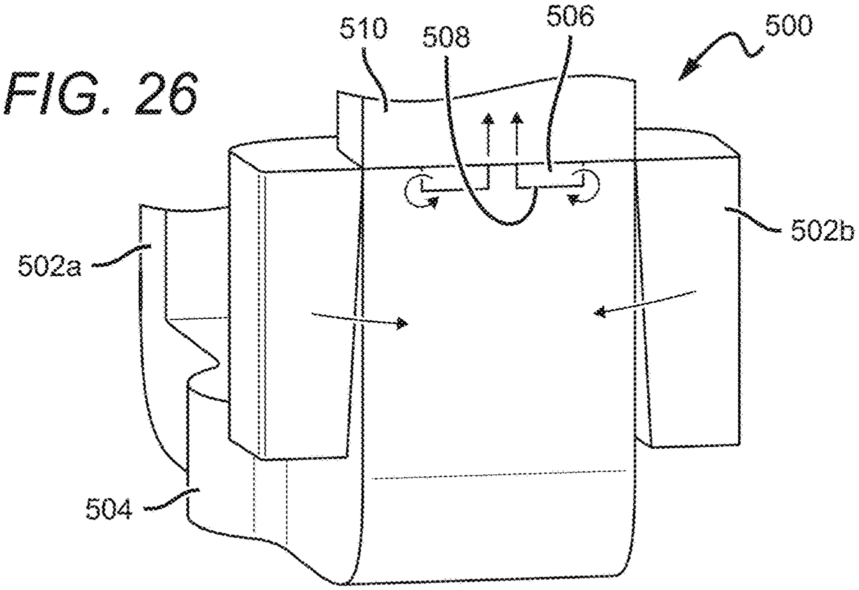
FIG. 26 is a partial section view of the levitation actuator shown in FIG. 25, taken along section lines 26-26.
Figure 27:
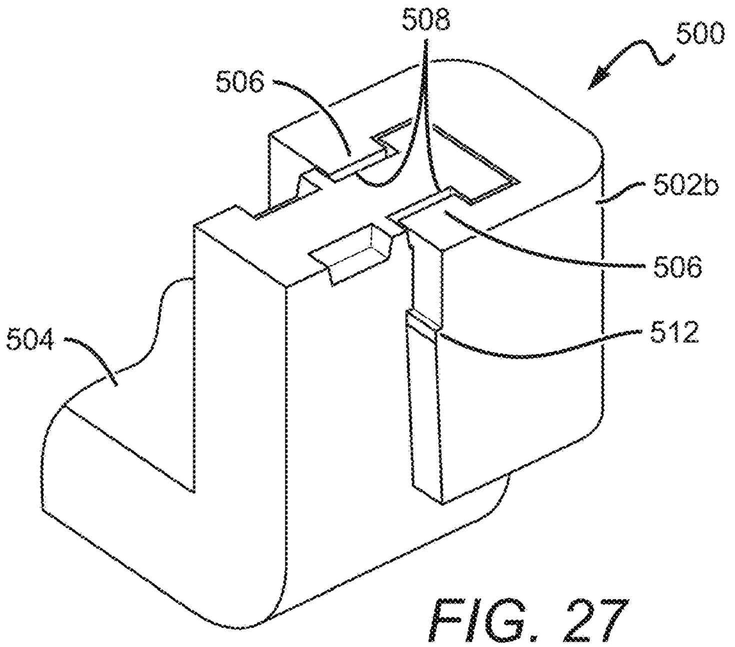
FIG. 27 is a partial sectional view of the levitation actuator shown in FIG. 25, taken along section lines 27-27.

FIG. 25-27 show another embodiment of a levitation actuator 500 according to the present invention comprising two opposing moveable yokes 502*a*, 502*b* mounted to the movable contact 504 on one of its vertical legs. Each of the movable yokes has opposing tabs 506 (shown in FIGS. 26 and 27), each resting in one of the movable contact grooves 508 at the top surface of the movable contact. This results in the tabs being at the surface between the movable contact 504 and one of the fixed contacts 510.

The yokes 502*a*, 502*b* can be made of the materials discussed above, and as current passes through the contacts 504, 510, magnetic fields are generated by the yokes 502*a*, 502*b*. These magnetic fields draw the yokes 502*a*, 502*b* toward one another, and to rotate slightly about the ledges 512, to close the gap 514. This rotation causes the tabs 506 to rotate in their respective groove 508 to product a separation force between the movable contact 504 and fixed contact 510. At elevated currents, this separation force is sufficient to separate the movable contact 504 from the fixed contact 510. This in turn causes activation of the squib to generate a fuse blown event.

Figure 28:
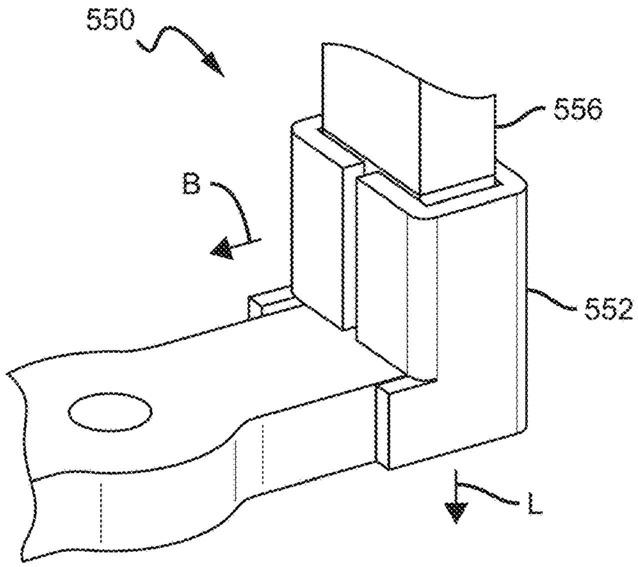
FIG. 28 is a sectional view of still another levitation actuator according to the present invention.
Figure 29:
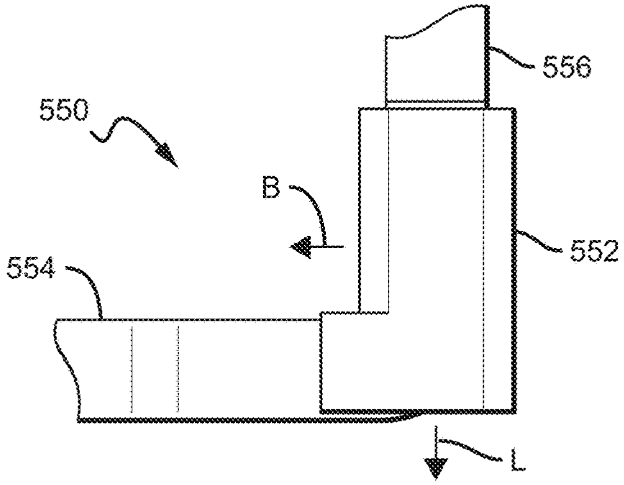
FIG. 29 is a side view of the levitation actuator shown in FIG. 28.
Figure 30:
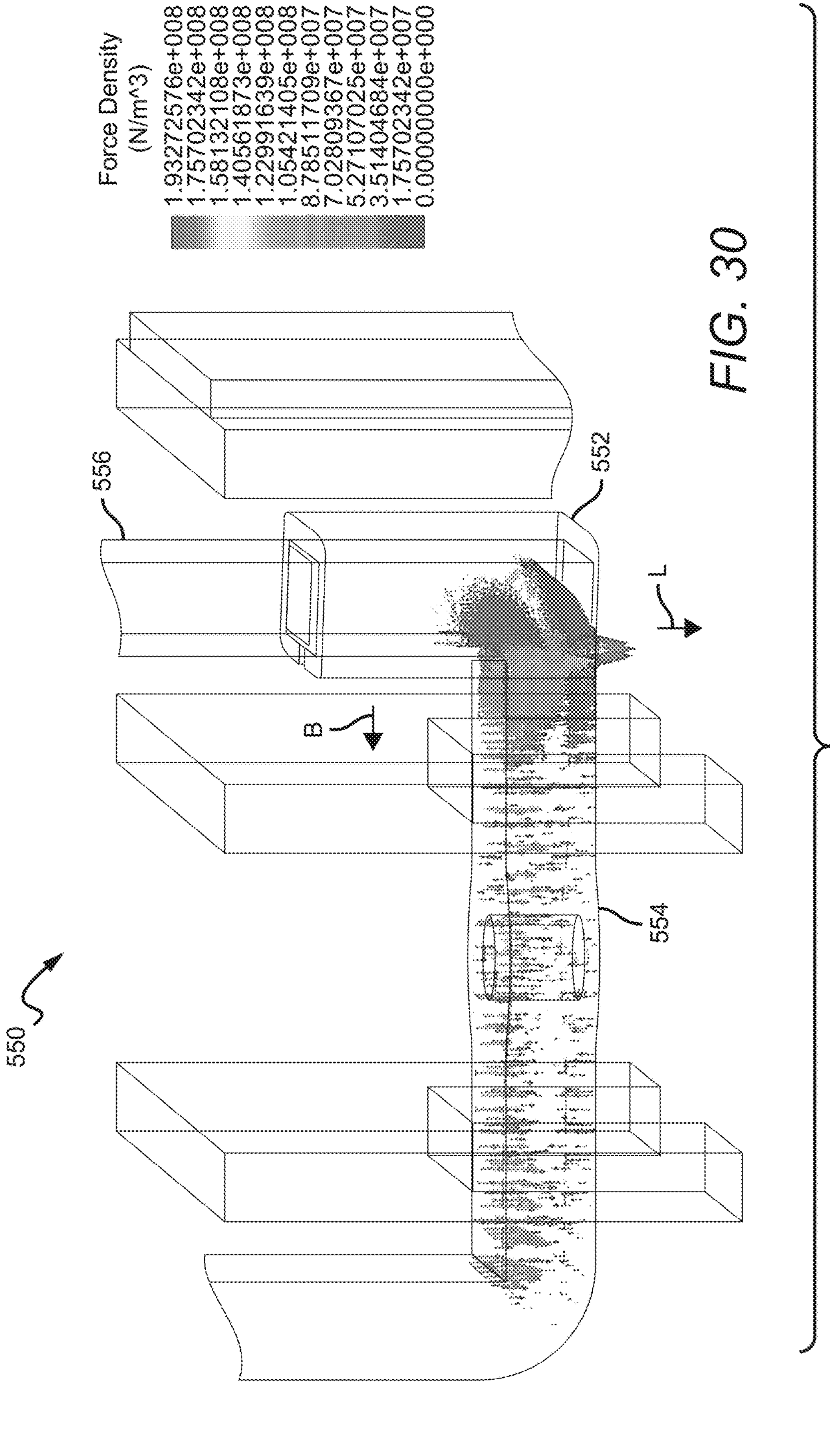
FIG. 30 is a sectional view if the levitation actuator shown in FIG. 28 showing the magnetic field generated during operation.

FIGS. 28-30 show another embodiment of a levitation actuator 550 according to the present invention that comprises a trigger 552 that is mounted primarily on a vertical leg (or portion) of the movable contact 554, with a portion covering surfaces of the horizontal portion of the moveable contact 554 near the transition to the vertical leg. The trigger 552 can be made of the material discussed above and generates a magnetic field B, which is parallel to the current flow in the movable contact. This in turn creates a Lorentz force L (i.e. electromagnetic trigger field) which creates an opening Lorentz force. At elevated current through the movable contact 554 and the fixed contact 556, this Lorentz force can be sufficient to cause separation between the movable and fixed contact 554, 556, thereby causing a fuse blown event.

The levitation actuator 550 provides a simple approach with no moving parts. It provides the further advantage that the trigger arrangement in this embodiment creates the same Lorentz field with current flowing through the contacts in different directions. This provides flexibility in using this levitation actuator in fuse devices where current may flow on both directions through the contacts.

It is noted that the energy released in high energy fuse blown events (e.g. 10 MW) can damage the fuse package. Good contact gap and arc strong magnetic blow out strength may not interrupt a 10 MW or greater interruption if the package is week. This be of an issue as the fuse package size is reduced. A common failure point in these fuse devices can be along edge of the cup at the interface with the cap assembly.

Different embodiments of the present invention can also include different feature to improve the strength of the fuse devices against this damage touring a fuse blown event. It is understood that these features can be applied to each of the embodiments described above.

Figure 31:
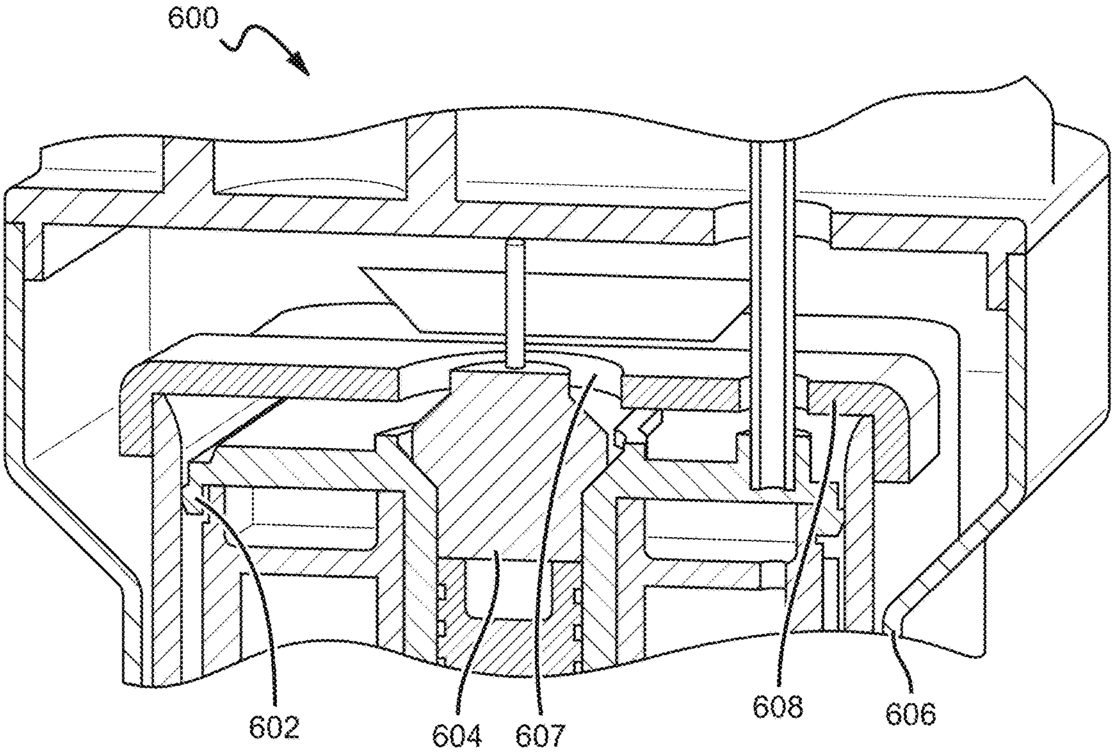
FIG. 31 shows another embodiment of a fuse device according to the present invention.

FIG. 31 shows one embodiment of a fuse device 600 according to the present invention having a cap assembly 602, squib 604 and a cup 606. In this embodiment, a strap 608 can be included mounted across the top of the cup 606. The strap 608 can be included in many different locations, with the strap shown spanning across the center of the cup and can have a squib opening 607 to allow access to the squib 604. The strap 608 can be made of many different rugged materials, such as different metals or plastics, and can be mounted to the cup using known mounting methods and materials.

Figure 32:
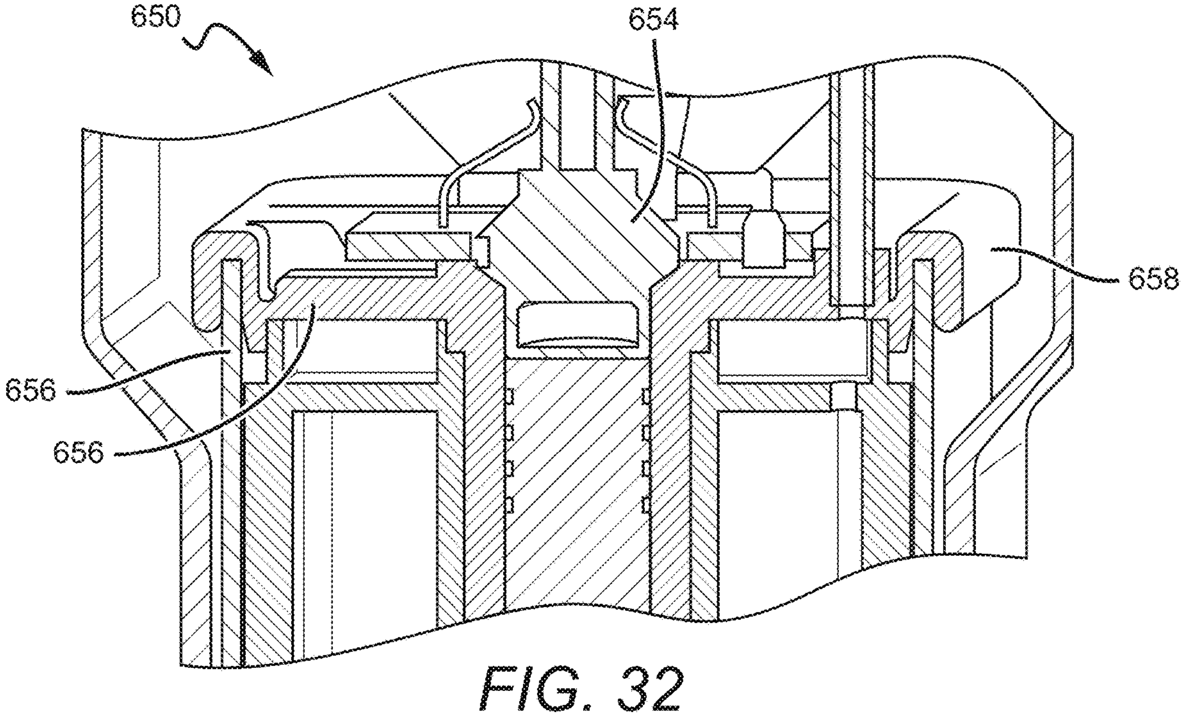
FIG. 32 shows still another embodiment of a fuse device according to the present invention.

FIG. 32 shows another embodiment of a fuse device 650 according to the present invention having a cap assembly 652, squib 654 and cup 656. The cap assembly 652 is provided with a reinforcing lip 658 that passes over the top edge of the cup 656 and down the top portion of the outside surface of the cup 656. This not only provides and improved seal between the cap assemble 652 and the cup 656, but also reduces that outward flex of the upper cup during a fuse blown event.

It is understood that other features can be included to improve the fuse package strength, such as increased potting thickness around the top of the cup 656. This is only one additional features that can be included to add strength, and the present invention should not be limited to these particular embodiments.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention, wherein no portion of the disclosure is intended, expressly or implicitly, to be dedicated to the public domain if not set forth in any claims.

We claim:

1. An electrical switching device, comprising:

at least two fixed contacts;

a movable contact arranged to operate in a first position and a second position, the movable contact;

in electrical contact with the at least two fixed contacts in the first position, and spaced from the at least two fixed contacts in the second position;

a levitation actuator mounted on the movable contact or one of the at least two fixed contacts to cause separation between the movable contact and at least one of the at least two fixed contacts when the movable contact is in the first position and a threshold current passes through the at least two fixed contacts and the movable contact;

a catch to hold the movable contact in the second position; and a pyrotechnic device to, upon activation based on the separation, cause the movable contact to move from the first position to the second position.

2. The electrical switching device of claim 1, wherein:

the movable contact comprises a vertical portion, and the levitation actuator comprises opposing yokes mounted to the vertical portion.

3. The electrical switching device of claim 1, wherein;

the movable contact comprises a vertical portion, and the levitation actuator comprises a trigger mounted to the vertical portion.

4. The electrical switching device of claim 1, wherein the threshold current passing through the at least two fixed contacts and the movable contact is used to activate the pyrotechnic device.

5. The electrical switching device of claim 1, wherein the levitation actuator comprises an L-shaped prybar.

6. The electrical switching device of claim 1, wherein the levitation actuator is at least partially made of a ferromagnetic material.

7. The electrical switching device of claim 1, wherein the levitation actuator comprises a first bar below the movable contact and a second bar mounted to the movable contact.

8. The electrical switching device of claim 7, wherein the second bar is U-shaped.

9. The electrical switching device of claim 7, wherein the levitation actuator comprises guides mounted to the at least two fixed contacts and guiding movement of the second bar.

10. An electrical switching device, comprising:

a housing;

fixed contacts arranged to be electrically coupled to outside components outside of the housing and to conduct an electrical signal from the outside components to components internal to the housing;

a movable contact within the housing, the movable contact movable from a first position to a second position, the first position allowing current flow between the fixed contacts and the movable contact, and the second position preventing current flow between the fixed contacts and the movable contact;

a levitation actuator to cause movement of the movable contact from the first position creating separation between the moveable contact and one of the fixed contacts, the levitation actuator comprising a first bar below the movable contact and a second bar mounted to the movable contact;

a catch to hold the movable contact in the second position; and a pyrotechnic device to, upon activation based on the separation, cause the movable contact to move from the first position to the second position.

11. The electrical switching device of claim 10, where the levitation actuator is at least partially made of a ferromagnetic material.

12. The electrical switching device of claim 10, wherein the levitation actuator is mounted on the movable contact or one of the fixed contacts.

13. The electrical switching device of claim 12, wherein the levitation actuator comprises one of: an L-shaped prybar, opposing yokes, or a trigger.

14. The electrical switching device of claim 10, wherein the movable contact is in contact with the fixed contacts in the first position, and wherein the levitation actuator causes the separation between the movable contact and the one of the fixed contacts when the movable contact is in the first position and a threshold current passes though the fixed contacts and the movable contact.

15. The electrical switching device of claim 5, wherein the threshold current passing through the fixed contacts and the movable contact is used to activate the pyrotechnic device.

16. An electrical system, comprising:

an electrical circuit; and an electrical switching device electrically connected to the electrical circuit to open or close the electrical circuit, wherein the electrical switching device comprises:

at least two fixed contacts, a movable contact arranged to operate in a first position and a second position, the movable contact:

in electrical contact with the at least two fixed contacts in the first position, and spaced from the at least two fixed contacts in the second position, a levitation actuator mounted on the movable contact or one of the at least two fixed contacts to cause separation between the movable contact and at least one of the at least two fixed contacts when the movable contact is in the first position and a threshold current passes though the at least two fixed contacts and the movable contact, a catch to hold the movable contact in the second position, and a pyrotechnic device to, upon activation based on the separation, cause the movable contact to move from the first position to the second position.

17. The electrical system of claim 16, wherein the levitation actuator is at least partially made of a ferromagnetic material.

18. The electrical system of claim 16, wherein the levitation actuator comprises a first bar below the movable contact and a second bar mounted to the movable contact.

19. The electrical system of claim 16, wherein the threshold current passing through the at least two fixed contacts and the movable contact causes the separation to activate the pyrotechnic device.

* * * * *